United States Patent
Toshiyuki

(10) Patent No.: US 10,418,892 B2
(45) Date of Patent: Sep. 17, 2019

(54) ELECTRIC POWER CONVERSION CIRCUIT FOR REDUCING SWITCHING LOSS COMPRISING MULTIPLE FILED EFFECT TRANSISTORS AND A GATE CONTROLLER

(71) Applicant: TOYOTA JIDOSHA KABUSHIKI KAISHA, Toyota-shi, Aichi-ken (JP)

(72) Inventor: Ken Toshiyuki, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/053,025

(22) Filed: Aug. 2, 2018

(65) Prior Publication Data
US 2019/0089238 A1 Mar. 21, 2019

(30) Foreign Application Priority Data
Sep. 20, 2017 (JP) .................................. 2017-180600

(51) Int. Cl.
*H02M 1/08* (2006.01)
*H02M 3/158* (2006.01)
*H02M 7/00* (2006.01)
*H02M 7/5387* (2007.01)
(Continued)

(52) U.S. Cl.
CPC ............. *H02M 1/083* (2013.01); *H02M 1/14* (2013.01); *H02M 3/158* (2013.01); *H02M 3/1582* (2013.01); *H02M 3/1584* (2013.01); *H02M 3/1588* (2013.01); *H02M 7/003* (2013.01); *H02M 7/53871* (2013.01); *H02M 2001/0048* (2013.01); *H02M 2001/0051* (2013.01);

(Continued)

(58) Field of Classification Search
CPC ...... H02M 1/083; H02M 3/158; H02M 7/003; H02M 7/53871; H02M 2001/0058; H02M 2001/0083; H02M 1/088; H02M 3/155; H02M 2003/1552; H02M 7/44; H02M 7/53; H02M 7/537; H02M 7/5387
See application file for complete search history.

(56) References Cited

U.S. PATENT DOCUMENTS

| 7,164,253 B2 * | 1/2007 | Sato ................... B60L 11/1803 318/105 |
| 9,570,973 B2 * | 2/2017 | Chen ................... H02M 1/4208 |
| 9,595,888 B2 * | 3/2017 | Tao ........................ H02M 7/538 |

(Continued)

FOREIGN PATENT DOCUMENTS

| JP | 2001-186768 A | 7/2001 |
| KR | 1020110138592 A | 12/2011 |

*Primary Examiner* — Gustavo A Rosario-Benitez
(74) *Attorney, Agent, or Firm* — Hunton Andrews Kurth LLP

(57) ABSTRACT

In an electric power conversion circuit, a gate controller executes a first operation. In the first operation, the gate controller performs control such that a first lower FET, a first upper FET, a second lower FET, and a second upper FET satisfy the following conditions: a condition that a first state in which the first lower FET is turned on, a second state in which both of the lower FETs are turned off, a third state in which the second lower FET is turned on, and a fourth state in which both of the lower FETs are turned off appear repeatedly in the order; and a condition that the first upper FET is turned on at a middle of a period of the second state and is maintained in an on state until a middle of a period of the third state.

9 Claims, 13 Drawing Sheets

(51) Int. Cl.
*H02M 1/14* (2006.01)
*H02M 1/00* (2006.01)

(52) U.S. Cl.
CPC .............. *H02M 2001/0058* (2013.01); *H02M 2003/1586* (2013.01)

(56) References Cited

U.S. PATENT DOCUMENTS

| | | | |
|---|---|---|---|
| 2008/0049475 A1* | 2/2008 | Watanabe | H02M 3/1582 363/127 |
| 2010/0061122 A1* | 3/2010 | Okubo | H02M 3/158 363/20 |
| 2011/0210713 A1 | 9/2011 | Kazama | |
| 2014/0133206 A1* | 5/2014 | Shoji | H02M 7/5387 363/132 |
| 2015/0214859 A1* | 7/2015 | Chen | H02M 1/126 363/132 |
| 2016/0380478 A1 | 12/2016 | Wells et al. | |
| 2017/0126146 A1* | 5/2017 | Petersen | H02M 3/158 |
| 2018/0097441 A1* | 4/2018 | Chang | H02H 7/122 |
| 2019/0089239 A1* | 3/2019 | Toshiyuki | H02M 1/083 |
| 2019/0089253 A1* | 3/2019 | Toshiyuki | H02M 3/1588 |

\* cited by examiner

FIG. 8
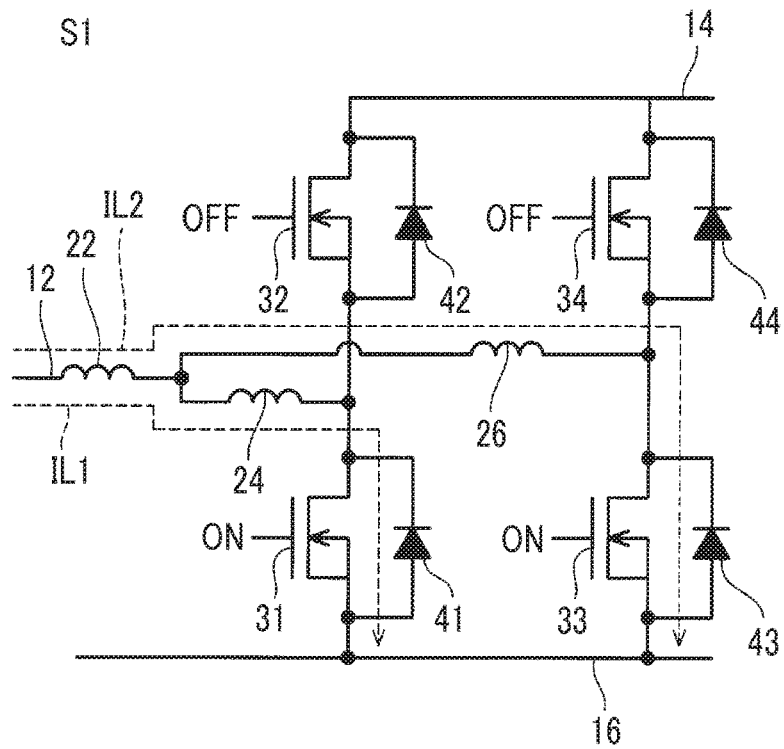
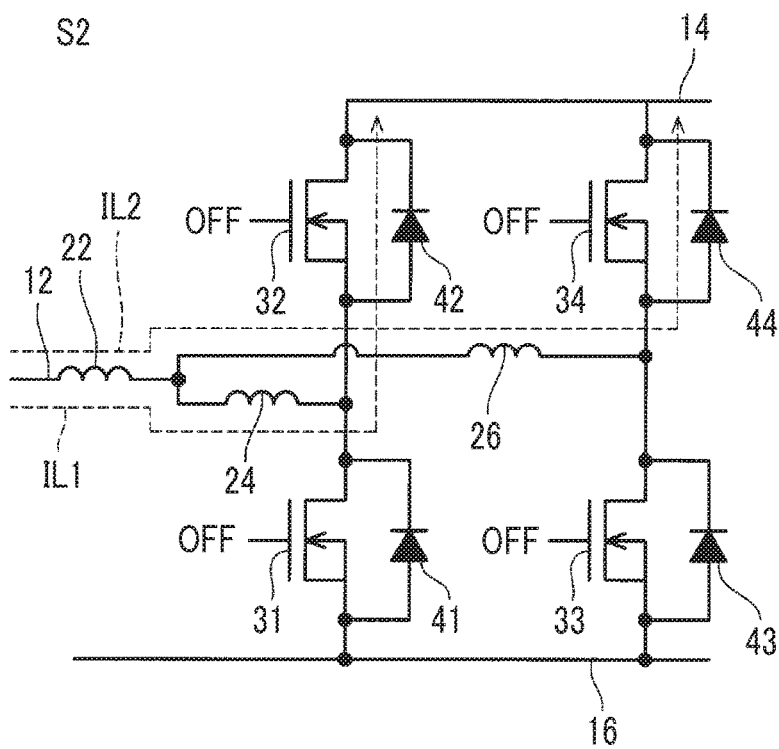

ELECTRIC POWER CONVERSION CIRCUIT FOR REDUCING SWITCHING LOSS COMPRISING MULTIPLE FILED EFFECT TRANSISTORS AND A GATE CONTROLLER

INCORPORATION BY REFERENCE

The disclosure of Japanese Patent Application No. 2017-180600 filed on Sep. 20, 2017 including the specification, drawings and abstract is incorporated herein by reference in its entirety.

BACKGROUND

1. Technical Field

A technique of the present disclosure relates to an electric power conversion circuit.

2. Description of Related Art

Japanese Unexamined Patent Application Publication No. 2001-186768 (JP 2001-186768 A) discloses a DC-DC converter that boosts and outputs a voltage supplied from a direct current power supply. The DC-DC converter includes two n-channel lower field effect transistors (FET) having a source connected to a low potential wiring. A drain of a first lower FET is connected to a high potential output wiring through a first diode. A drain of a second lower FET is connected to the high potential output wiring through a second diode. The DC-DC converter has a main reactor, a first sub-reactor, and a second sub-reactor. The main reactor includes a first terminal and a second terminal. The first terminal of the main reactor is connected to a diode bridge (a kind of a direct current power supply) through a high potential input wiring. A first end of the first sub-reactor is connected to the second terminal of the main reactor. A second end of the first sub-reactor is connected to the drain of the first lower FET. A first end of the second sub-reactor is connected to the second terminal of the main reactor. A second end of the second sub-reactor is connected to the drain of the second lower FET. The first lower FET and the second lower FET are controlled to be alternately turned on. A current flows in the first diode when the first lower FET is switched from on to off. A current flows in the second diode when the second lower FET is switched from on to off. As a result, a relatively high voltage is output to the high potential output wiring. In a case where the first lower FET and the second lower FET are controlled as described above, switching loss that is generated in the first lower FET and the second lower FET is reduced.

SUMMARY

In order to more effectively reduce the current that flows in the first diode, an n-channel field effect transistor (hereinafter, referred to as a first upper FET) connected in parallel with the first diode may be provided. In order to more effectively reduce the current that flows in the second diode, an n-channel field effect transistor (hereinafter, referred to as a second upper FET) connected in parallel with the second diode may be provided. The first upper FET is turned on in conformity with the timing at which the current flows in the first diode, whereby it is possible to disperse the current, and to more effectively reduce switching loss (hereinafter, referred to as "loss") to be generated. Similarly, the second upper FET is turned on in conformity with the timing at which the current flows in the second diode, whereby it is possible to disperse the current, and to more effectively reduce loss to be generated. Although the DC-DC converter that boosts the voltage supplied from the direct current power supply has been described, the same configuration can be employed in an inverter that converts direct current electric power to alternating current electric power. In the specification, a technique that more effectively reduces loss by extending the on time of the upper FET in an electric power conversion circuit, such as a DC-DC converter or an inverter, will be suggested.

An aspect of the present disclosure relates to an electric power conversion circuit. The electric power conversion circuit includes a first high potential wiring, a second high potential wiring, a low potential wiring, an n-channel first lower FET, an n-channel first upper FET, an n-channel second lower FET, an n-channel second upper FET, a first diode, a second diode, a main reactor, a first sub-reactor, a second sub-reactor, and a gate controller. The first high potential wiring is connected to an electric power supply source. The n-channel first lower FET has a source connected to the low potential wiring. The n-channel first upper FET has a source connected to a drain of the first lower FET and a drain connected to the second high potential wiring. The n-channel second lower FET has a source connected to the low potential wiring. The n-channel second upper FET has a source connected to a drain of the second lower FET and a drain connected to the second high potential wiring. The first diode has an anode connected to the source of the first upper FET and a cathode connected to the drain of the first upper FET. The second diode has an anode connected to the source of the second upper FET and a cathode connected to the drain of the second upper FET. The main reactor has a first terminal and a second terminal. The first terminal is connected to the first high potential wiring. The first sub-reactor has a first end connected to the second terminal of the main reactor and a second end connected to the drain of the first lower FET. The second sub-reactor has a first end connected to the second terminal of the main reactor and a second end connected to the drain of the second lower FET. The gate controller is connected to a gate of the first lower FET, a gate of the first upper FET, a gate of the second lower FET, and a gate of the second upper FET. The gate controller is configured to execute a first operation. The gate controller is configured to perform control, in the first operation, such that the first lower FET, the first upper FET, the second lower FET, and the second upper FET satisfy the following conditions. (Condition 1) A first state in which the first lower FET is turned on and the second lower FET is turned off, a second state in which both of the first lower FET and the second lower FET are turned off, a third state in which the first lower FET is turned off and the second lower FET is turned on, and a fourth state in which both of the first lower FET and the second lower FET are turned off appear repeatedly in the order. (Condition 2) The first upper FET is turned on at a first timing in a middle of a period of the second state, the first upper FET is maintained in an on state until a second timing in a middle of a period of the third state, and the first upper FET is turned off at the second timing.

In the specification, the n-channel FETs include an insulated gate bipolar transistor (IGBT). In the IGBT, a drain may be referred to as a collector, and a source may be referred to as an emitter.

With the electric power conversion circuit according to the aspect of the present disclosure, the FETs are controlled such that Condition 1 is satisfied. When the first lower FET is switched from on to off, a current flows in the first diode. That is, a current flows in the first diode immediately after switching from the first state to the second state. The current flows in the first diode from the period of the second state (that is, a state after the first lower FET is switched from on to off) to the period of the third state (that is, a state after the second lower FET is switched from off to on). As shown in Condition 2, the first upper FET is turned on at the first timing in the middle of the period of the second state. For this reason, a part of the current that flows in the first diode flows in the first upper FET. In general, in order to restrain short-circuit between the second high potential wiring and the low potential wiring, the upper FET is turned off before the lower FET is turned on. However, with the electric power conversion circuit according to the aspect of the present disclosure, the first upper FET is maintained in the on state even after the second lower FET is turned on. That is, the first upper FET is maintained in the on state from the first timing in the middle of the period of the second state to the second timing in the middle of the period of the third state. Accordingly, the current flows in the first upper FET until the middle of the period of the third state. As described above, since the on time of the first upper FET is comparatively long, a time for which the current is dispersed and flows in the first upper FET and the first diode is comparatively long. With this, loss to be generated is more effectively reduced. At the beginning of the period of the third state, both of the first upper FET and the second lower FET are brought into the on state. However, since there are the first sub-reactor and the second sub-reactor between the first upper FET and the second lower FET, a voltage is retained with the first sub-reactor and the second sub-reactor, and a short-circuit state (that is, a state in which an overcurrent flows) is not brought between the second high potential wiring and the low potential wiring. As described above, with the electric power conversion circuit according to the aspect of the present disclosure, it is possible to more effectively reduce loss to be generated by making the on time of the first upper FET comparatively long while restraining short-circuit between the second high potential wiring and the low potential wiring.

In the electric power conversion circuit according to the aspect of the present disclosure, the gate controller may be configured to perform control, in the first operation, such that the first lower FET, the first upper FET, the second lower FET, and the second upper FET satisfy a condition that the first state is brought next to the fourth state, and a condition that the second upper FET is turned on at a third timing in a middle of a period of the fourth state, the second upper FET is maintained in an on state until a fourth timing in a middle of a period of the first state, and the second upper FET is turned off at the fourth timing.

In the electric power conversion circuit according to the aspect of the present disclosure, the gate controller may be configured to execute a second operation. The gate controller may be configured to perform control, in the second operation, such that the first lower FET, the first upper FET, the second lower FET, and the second upper FET satisfy a condition that a state in which both of the first lower FET and the second lower FET are turned on and a state in which both of the first lower FET and the second lower FET are turned off appear alternately. The gate controller may be configured to execute the first operation when a current flowing in the main reactor is equal to or smaller than a threshold, and execute the second operation when the current flowing in the main reactor is greater than the threshold. The threshold is set to satisfy a relationship of $0.9 \times Ib < Ith < 1.1 \times Ib$ with respect to a boundary value between a current domain where loss generated in the first operation becomes equal to or less than loss generated in the second operation and a current domain where loss generated in the first operation becomes greater than loss generated in the second operation, where Ith denotes the threshold, Ib denotes the boundary value.

In the electric power conversion circuit according to the aspect of the present disclosure, the gate controller may be configured to perform control, in the second operation, such that the first lower FET, the first upper FET, the second lower FET, and the second upper FET satisfy a condition that the following states appear repeatedly in the order: a state in which both of the first lower FET and the second lower FET are turned on and both of the first upper FET and the second upper FET are turned off; a state in which all of the first lower FET, the second lower FET, the first upper FET, and the second upper FET are turned off; a state in which both of the first lower FET and the second lower FET are turned off and both of the first upper FET and the second upper FET are turned on; and a state in which all of the first lower FET, the second lower FET, the first upper FET, and the second upper FET are turned off.

In the electric power conversion circuit according to the aspect of the present disclosure, the gate controller may be configured to perform control, in the second operation, such that the first lower FET, the first upper FET, the second lower FET, and the second upper FET satisfy a condition that the following states appear alternately: a state in which both of the first lower FET and the second lower FET are turned on and both of the first upper FET and the second upper FET are turned off; and a state in which all of the first lower FET, the second lower FET, the first upper FET, and the second upper FET are turned off.

The electric power conversion circuit according to the aspect of the present disclosure may further include an n-channel third lower FET, an n-channel third upper FET, a third diode, and a third sub-reactor. The n-channel third lower FET has a source connected to the low potential wiring. The n-channel third upper FET has a source connected to a drain of the third lower FET and a drain connected to the second high potential wiring. The third diode has an anode connected to the source of the third upper FET and a cathode connected to the drain of the third upper FET. The third sub-reactor has a first end connected to the second terminal of the main reactor and a second end connected to the drain of the third lower FET. The gate controller may be connected to a gate of the third lower FET and a gate of the third upper FET. The gate controller may perform control such that the third lower FET is turned off in the first state, the second state, the third state, and the fourth state. In the first operation, the gate controller may perform control such that the first lower FET, the first upper FET, the second lower FET, the second upper FET, the third lower FET, and the third upper FET satisfy a condition that the first state, the second state, the third state, the fourth state, a fifth state, and a sixth state appear repeatedly in the order, and a condition that the second upper FET is turned on at a fifth timing in the middle of a period of the fourth state, the second upper FET is maintained in an on state until a sixth timing in a middle of a period of the fifth state, and the second upper FET is turned off at the sixth timing. The fifth state may be a state in which the first lower FET is turned off, the second lower FET is turned off, and the third lower FET is turned on. The sixth state may be a state in which all of the first lower FET, the second lower FET, and the third lower FET are turned off.

In the electric power conversion circuit according to the aspect of the present disclosure, the gate controller may perform control, in the first operation, such that the first lower FET, the first upper FET, the second lower FET, the second upper FET, the third lower FET, and the third upper FET satisfy a condition that the first state is brought next to the sixth state, and a condition that the third upper FET is turned on at a seventh timing in a middle of a period of the sixth state, the third upper FET is maintained in an on state until an eighth timing in the middle of a period of the first state, and the third upper FET is turned off at the eighth timing.

In the electric power conversion circuit according to the aspect of the present disclosure, the electric power conversion circuit may be a DC-DC converter.

In the electric power conversion circuit according to the aspect of the present disclosure, the electric power conversion circuit may be an inverter.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a graph showing change in a current and a voltage when a MOSFET is turned on;

FIG. 8 is a diagram showing change in a state of a DC-DC converter in a second operation of a first modification example;

DETAILED DESCRIPTION OF EMBODIMENTS

Figure 1:
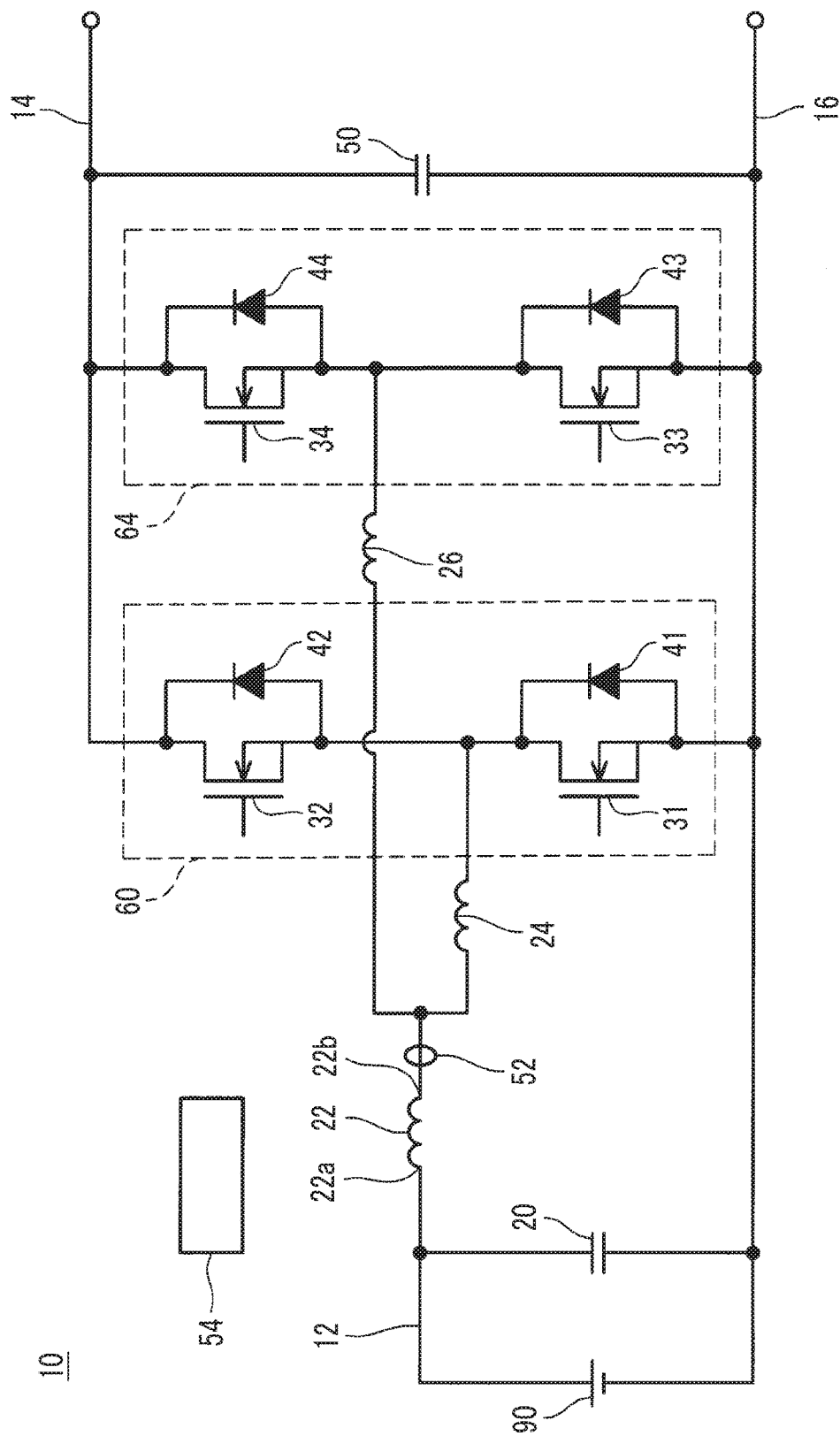
FIG. 1 is a circuit diagram of a DC-DC converter.

FIG. 1 is a circuit diagram of a DC-DC converter 10 of Example 1. The DC-DC converter 10 is mounted in a vehicle. The DC-DC converter 10 has a high potential input wiring 12, a high potential output wiring 14, and a low potential wiring 16. The high potential input wiring 12 is connected to a positive electrode of a direct current power supply 90 (for example, a battery). The low potential wiring 16 is connected to a negative electrode of the direct current power supply 90. The DC-DC converter 10 boosts an application voltage (that is, a voltage between the high potential input wiring 12 and the low potential wiring 16) of the direct current power supply 90, and applies the boosted voltage between the high potential output wiring 14 and the low potential wiring 16. Though not shown, an inverter or a motor for traveling is connected as a load between the high potential output wiring 14 and the low potential wiring 16. Accordingly, the boosted voltage is supplied to the load.

The DC-DC converter 10 has an input-side smoothing capacitor 20, a main reactor 22, a first sub-reactor 24, a second sub-reactor 26, MOSFETs 31 to 34, diodes 41 to 44, an output-side smoothing capacitor 50, a current sensor 52, and a gate controller 54.

The input-side smoothing capacitor 20 is connected between the high potential input wiring 12 and the low potential wiring 16.

Figure 2:
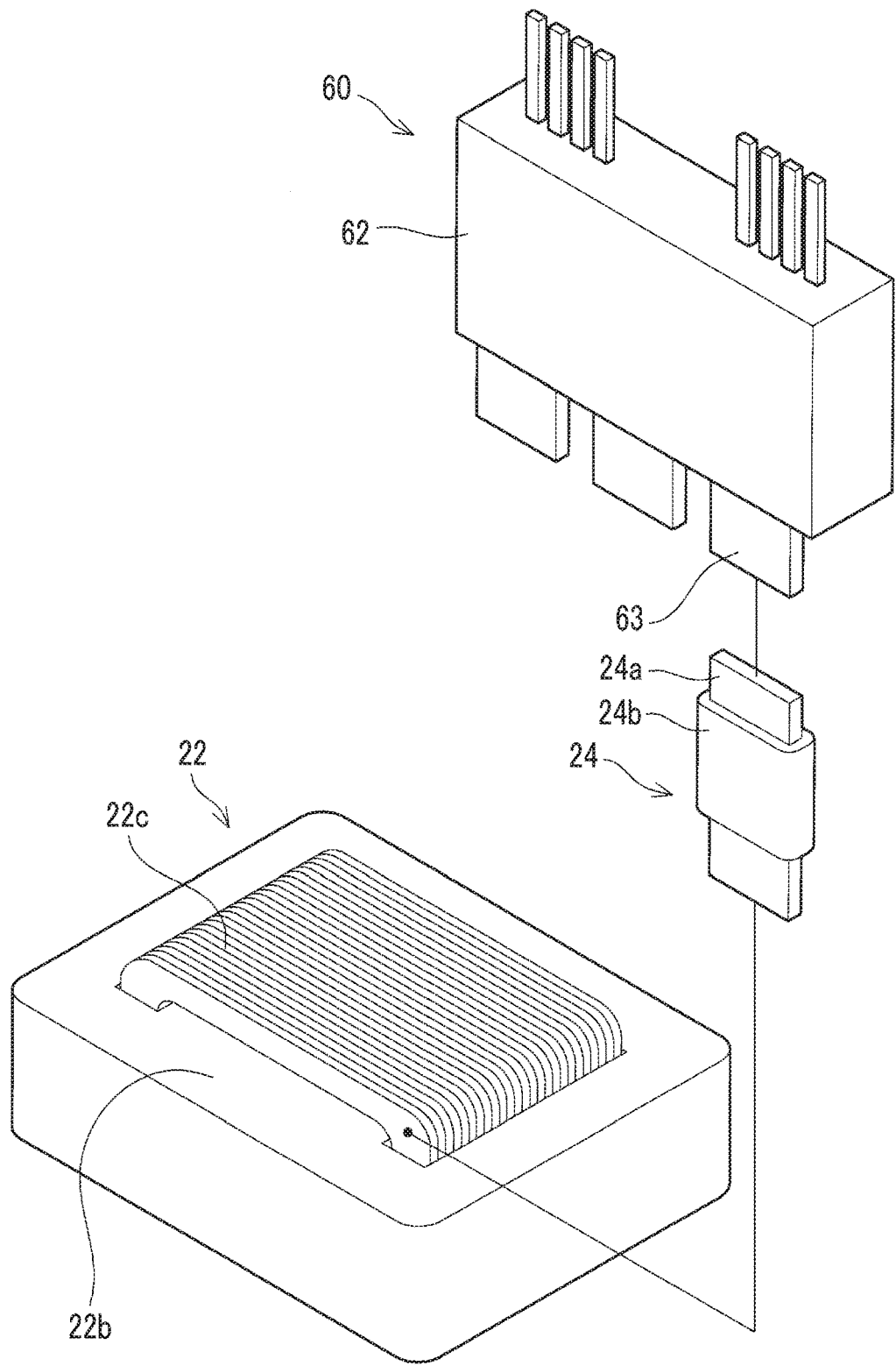
FIG. 2 is a perspective view of a component constituting a MOSFET, a first sub-reactor, and a main reactor.

The MOSFETs 31, 32, 33, 34 are n-channel MOSFETs. The MOSFET 31 and the MOSFET 32 are connected in series between the high potential output wiring 14 and the low potential wiring 16. A source of the MOSFET 31 is connected to the low potential wiring 16. A drain of the MOSFET 31 is connected to a source of the MOSFET 32. A drain of the MOSFET 32 is connected to the high potential output wiring 14. The diode 41 is connected in parallel with the MOSFET 31. An anode of the diode 41 is connected to the source of the MOSFET 31. A cathode of the diode 41 is connected to the drain of the MOSFET 31. The diode 42 is connected in parallel with the MOSFET 32. An anode of the diode 42 is connected to the source of the MOSFET 32. A cathode of the diode 42 is connected to the drain of the MOSFET 32. The MOSFET 31, the MOSFET 32, the diode 41, and the diode 42 are constituted of a component 60 with semiconductor chips constituting the MOSFET 31, the MOSFET 32, the diode 41, and the diode 42 sealed with insulating resin. The component 60 may be referred to as a power card. As shown in FIG. 2, the component 60 has insulating resin 62, and a plurality of terminals that protrudes outward from the insulating resin 62. The MOSFET 31, the MOSFET 32, the diode 41, and the diode 42 are embedded inside the insulating resin 62, and are connected to respective terminals inside the insulating resin 62.

As shown in FIG. 1, the MOSFET 33 and the MOSFET 34 are connected in series between the high potential output wiring 14 and the low potential wiring 16. A source of the MOSFET 33 is connected to the low potential wiring 16. A drain of the MOSFET 33 is connected to a source of the MOSFET 34. A drain of the MOSFET 34 is connected to the high potential output wiring 14. The diode 43 is connected in parallel with the MOSFET 33. An anode of the diode 43 is connected to the source of the MOSFET 33. A cathode of the diode 43 is connected to the drain of the MOSFET 33. The diode 44 is connected in parallel with the MOSFET 34. An anode of the diode 44 is connected to the source of the MOSFET 34. A cathode of the diode 44 is connected to the drain of the MOSFET 34. The MOSFET 33, the MOSFET 34, the diode 43, and the diode 44 are constituted of a component 64 similar to the component 60.

Hereinafter, a MOSFET (that is, the MOSFETs 31, 33) having the source connected to the low potential wiring 16 is referred to as a lower MOSFET, and a MOSFET (that is, the MOSFETs 32, 34) having the drain connected to the high potential output wiring 14 is referred to as an upper MOSFET.

The main reactor 22 has a first terminal 22a and a second terminal 22b. The first terminal 22a is connected to the high potential input wiring 12. As shown in FIG. 2, the main reactor 22 has a structure in which a winding 22c is wound around a core 22d made of a high magnetic permeability material multiple times.

As shown in FIG. 1, a first end of the first sub-reactor 24 is connected to the second terminal 22b of the main reactor 22. A second end of the first sub-reactor 24 is connected to the drain of the lower MOSFET 31 and the source of the upper MOSFET 32. Inductance of the first sub-reactor 24 is smaller than inductance of the main reactor 22. As shown in FIG. 2, the first sub-reactor 24 has a structure in which the periphery of a flat plate-shaped bus bar 24a extending linearly is covered with a core 24b made of a high magnetic permeability material. Since the inductance of the first sub-reactor 24 is not comparatively large, the first sub-reactor 24 can be provided in a structure in which the periphery of the linear bus bar 24a is covered with the core 24b, instead of a winding structure. With the above, the first sub-reactor 24 is reduced in size. A first end of the bus bar 24a is connected to a terminal 63 (a terminal connected to the drain of the lower MOSFET 31 and the source of the upper MOSFET 32) of the component 60. A second end of the bus bar 24a is connected to a first end (that is, the second terminal 22b) of the winding 22c of the main reactor 22.

As shown in FIG. 1, a first end of the second sub-reactor 26 is connected to the second terminal 22b of the main reactor 22. A second end of the second sub-reactor 26 is connected to the drain of the lower MOSFET 33 and the source of the upper MOSFET 34. Inductance of the second sub-reactor 26 is smaller than the inductance of the main reactor 22. The second sub-reactor 26 has a structure (a structure in which the periphery of a linear bus bar is covered with a core) similar to the first sub-reactor 24 shown in FIG. 2. With the above, the second sub-reactor 26 is reduced in size.

The output-side smoothing capacitor 50 is connected between the high potential output wiring 14 and the low potential wiring 16.

The current sensor 52 detects a current that flows in the main reactor 22. The current sensor 52 transmits the detected current value to the gate controller 54.

The gate controller 54 is connected to a gate of each of the MOSFETs 31 to 34. The gate controller 54 includes a drive circuit that performs charging and discharging of the gate for each MOSFET. The gate controller 54 includes a control circuit that sends a signal for commanding to turn on or off the MOSFET to the drive circuit. The gate controller 54 can perform control on the MOSFETs 31 to 34 independently.

The operation of the DC-DC converter 10 will be described. The gate controller 54 performs control on the MOSFETs 31 to 34 such that the lower MOSFET 31 and the upper MOSFET 32 are not in an on state simultaneously and the lower MOSFET 33 and the upper MOSFET 34 are not in an on state simultaneously, except for an erroneous operation due to noise or the like. With the above, short-circuit between the high potential output wiring 14 and the low potential wiring 16 is restrained. The gate controller 54 can execute a first operation and a second operation. The first operation is an operation to effectively suppress switching loss (loss generated at the time of switching of each MOSFET) of the DC-DC converter 10. The second operation is an operation to more effectively reduce steady loss (loss generated at the time other than switching) of the DC-DC converter 10. The gate controller 54 executes the first operation when a current IL detected by the current sensor 52 is equal to or smaller than a threshold Ith, and executes the second operation when the current IL detected by the current sensor 52 is greater than the threshold Ith. The gate controller 54 performs control on the MOSFETs 31 to 34, whereby the first operation and the second operation are executed.

Figure 3:
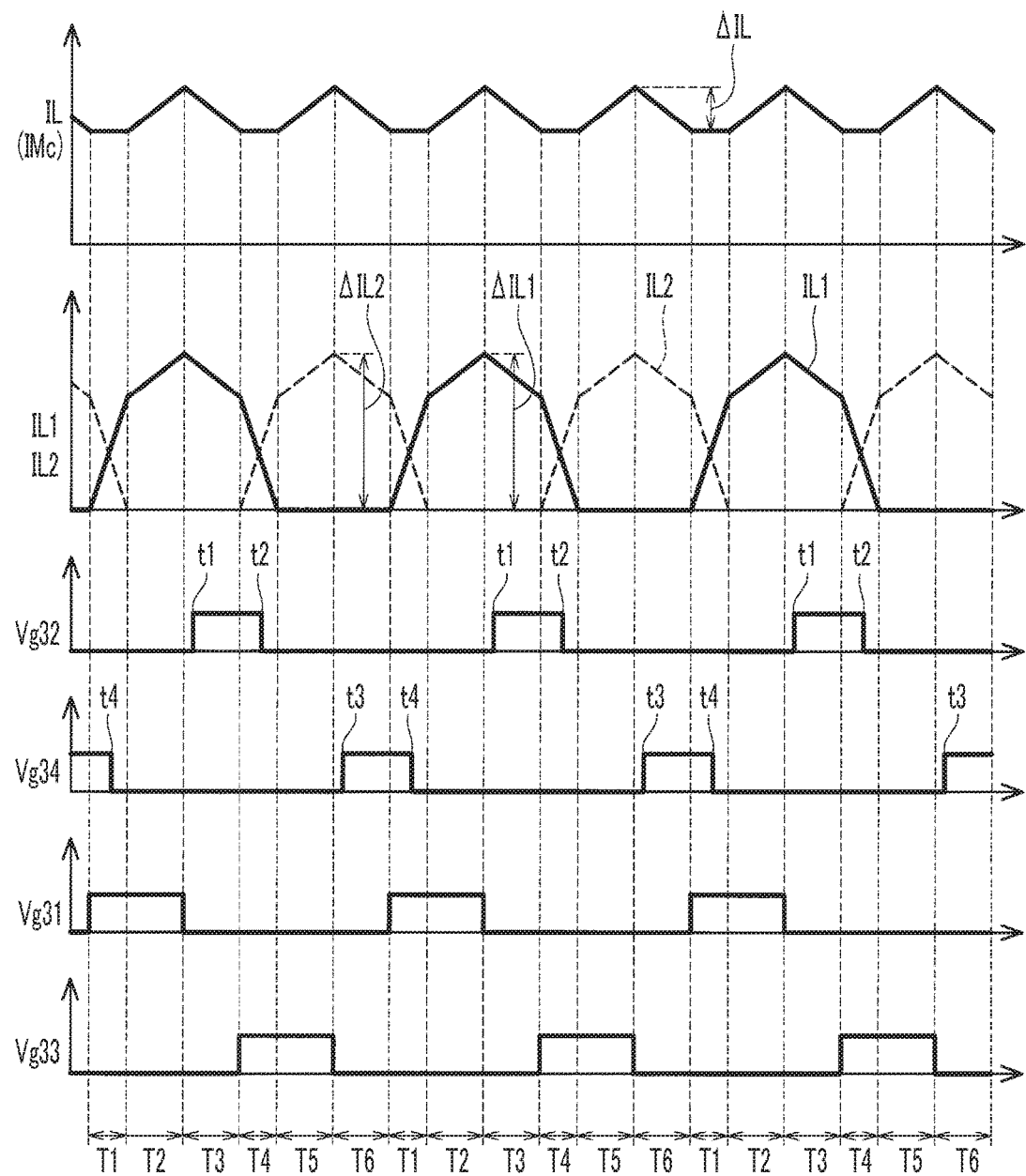
FIG. 3 is a graph showing change of respective values in a first operation.
Figure 4:
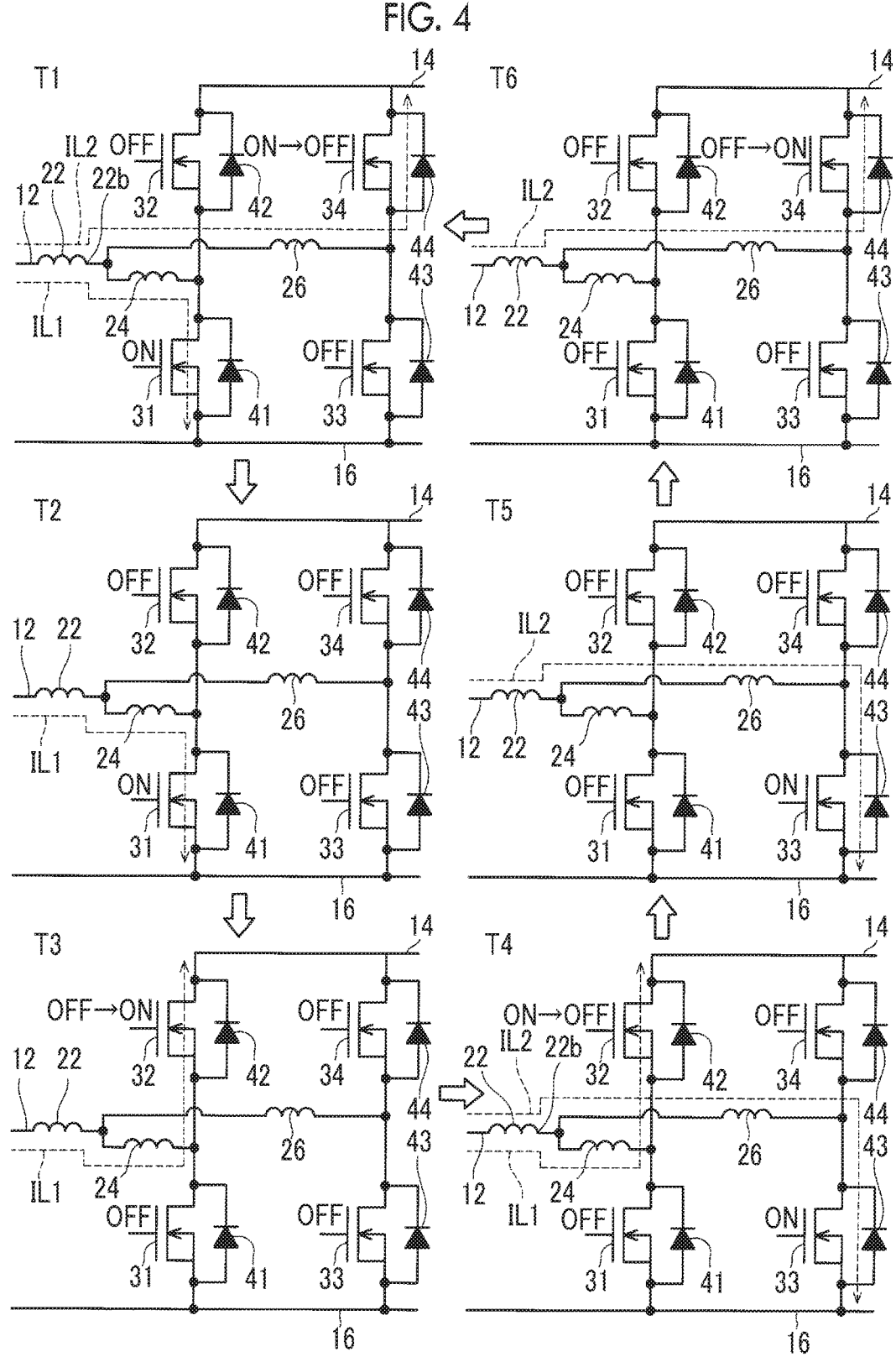
FIG. 4 is a diagram showing change in a state of the DC-DC converter in the first operation.

First, the first operation will be described. FIG. 3 is a graph showing change of respective values in the first operation. In FIG. 3, the current IL is a current that flows in the main reactor 22. A current IL1 is a current that flows in the first sub-reactor 24. A current IL2 is a current that flows in the second sub-reactor 26. The current IL is a total value of the current IL1 and the current IL2. In FIG. 3, a potential Vg31 is a gate potential of the lower MOSFET 31. A potential Vg32 is a gate potential of the upper MOSFET 32. A potential Vg33 is a gate potential of the lower MOSFET 33. A potential Vg34 is a gate potential of the upper MOSFET 34. The gate potentials Vg31 to Vg34 are controlled by the gate controller 54. The gate potentials Vg31 to Vg34 change between a high potential and a low potential. When the gate potential is a high potential, the MOSFET is brought into an on state, and when the gate potential is a low potential, the MOSFET is brought into an off state. As shown in FIG. 3, in the first operation, the gate controller 54 performs control such that a state of the DC-DC converter 10 changes in an order of a state T1, a state T2, a state T3, a state T4, a state T5, and a state T6, and returns to the state T1 next to the state T6. That is, the gate controller 54 performs control such that the cycle of the states T1 to T6 is repeated. The states T1 to T6 are shown in FIG. 4. In FIG. 4, a circuit configuration of the DC-DC converter 10 is simplified compared to that shown in FIG. 1.

As shown in FIGS. 3 and 4, in the state T1, the lower MOSFET 31 is turned on, the upper MOSFET 32 is turned off, the lower MOSFET 33 is turned off, and the upper MOSFET 34 is switched from on to off in the middle of a period of the state T1. In the state T1, since the lower MOSFET 31 is turned on, the current IL1 flows from the high potential input wiring 12 to the low potential wiring 16 through the main reactor 22, the first sub-reactor 24, and the lower MOSFET 31. Since an induction voltage (an induction voltage that is applied in a direction of blocking the current IL1) of the first sub-reactor 24 falls in the period of the state T1, the current IL1 rapidly increases in the period of the state T1. Though described below in detail, in the state T1, the current IL2 flows from the high potential input wiring 12 to the high potential output wiring 14 through the main reactor 22, the second sub-reactor 26, and the diode 44 with the induction voltage of the second sub-reactor 26. However, the current IL2 rapidly decreases in the period of the state T1. Accordingly, in the period of the state T1, the current IL hardly changes. In a case where the current IL2 decreases to zero in the state T1, the state T2 is brought.

In the state T2, the lower MOSFET 31 is maintained in the on state, and the current IL1 continuously flows. In a period of the state T2, since an induction voltage of the main reactor 22 and the induction voltage (the induction voltage that is applied in the direction of blocking the current IL1) of the first sub-reactor 24 fall, the current IL1 gradually increases in the period of the state T2. For this reason, the current IL also gradually increases. At the end of the period of the state T2, the lower MOSFET 31 is switched from the on state to the off state. With the above, the DC-DC converter 10 makes transition from the state T2 to the state T3.

At the beginning of the period of the state T3, the upper MOSFET 32 is turned off. In a case where the lower MOSFET 31 is turned off at the beginning of the state T3, the main reactor 22 and the first sub-reactor 24 generate the induction voltages in a direction of allowing the current IL1 to continuously flow; thus, a potential on the anode of the diode 42 rises. For this reason, the current IL1 flows from the high potential input wiring 12 to the high potential output wiring 14 through the main reactor 22, the first sub-reactor 24, and the diode 42. The current IL1 flows to the high potential output wiring 14 as described above, whereby the output-side smoothing capacitor 50 (see FIG. 1) is charged and a potential on the high potential output wiring 14 rises. In the period of the state T3, since the induction voltages (the induction voltages that are applied in a direction of allowing the current IL1 to flow) of the main reactor 22 and the first sub-reactor 24 fall, the current IL1 gradually decreases in the period of the state T3. For this reason, the current IL also gradually decreases.

At timing t1 in the middle of the period of the state T3, the upper MOSFET 32 is switched from the off state to the on state. In a case where the upper MOSFET 32 is turned on, the current IL1 is branched and flows into the diode 42 and the upper MOSFET 32. With the above, the current density of the diode 42 is lowered, and loss that is generated due to the current IL1 becomes small. In more detail, loss that is generated in the diode 42 and the upper MOSFET 32 when the current IL1 is branched and flows into the diode 42 and the upper MOSFET 32 becomes smaller than loss that is generated in the diode 42 when the upper MOSFET 32 is turned off and the current IL1 flows in the diode 42. As described above, the upper MOSFET 32 is turned on when the current IL1 flows in the diode 42, whereby it is possible to more effectively reduce loss. In particular, in a case where a body diode (a diode constituted of a pn junction of an interface of an n-type semiconductor region on the source side of the MOSFET and a p-type semiconductor region constituting a channel layer) of the upper MOSFET 32 is used as the diode 42, the current density of the diode 42 is likely to become high. Accordingly, the upper MOSFET 32 is turned on to lower the current density of the diode 42, whereby it is possible to effectively suppress loss. At the end of the period of the state T3, the lower MOSFET 33 is switched from the off state to the on state. With the above, the DC-DC converter 10 makes transition from the state T3 to the state T4.

At the beginning of a period of the state T4, the upper MOSFET 32 is maintained in the on state. That is, at the beginning of the period of the state T4, both of the upper MOSFET 32 and the lower MOSFET 33 are turned on. For this reason, the high potential output wiring 14 and the low potential wiring 16 are connected through the upper MOSFET 32, the first sub-reactor 24, the second sub-reactor 26, and the lower MOSFET 33. However, since the voltage between the high potential output wiring 14 and the low potential wiring 16 is retained with the first sub-reactor 24 and the second sub-reactor 26, an overcurrent does not flow between the high potential output wiring 14 and the low potential wiring 16. That is, the high potential output wiring 14 and the low potential wiring 16 are not brought into a short-circuit state.

In the state T4, since the lower MOSFET 33 is turned on, the current IL2 flows from the high potential input wiring 12 to the low potential wiring 16 through the main reactor 22, the second sub-reactor 26, and the lower MOSFET 33. Since an induction voltage (an induction voltage that is applied in a direction of blocking the current IL2) of the second sub-reactor 26 falls in the period of the state T4, the current IL2 rapidly increases in the period of the state T4. In the period of the state T4, the current IL1 flows continuously from the period of the state T3. However, in the period of the state T4, since the lower MOSFET 33 is turned on and the potential on the second terminal 22b of the main reactor 22 rapidly falls, the current IL1 rapidly decreases. Accordingly, in the state T4, the current IL hardly changes.

At the beginning of the period of the state T4, since the upper MOSFET 32 is turned on, the current IL1 is branched and flows into the diode 42 and the upper MOSFET 32. With the above, loss that is generated when the current IL1 flows is more effectively reduced. However, in a case where the on time of the upper MOSFET 32 is excessively long, a current may flow back to the upper MOSFET 32, and the high potential output wiring 14 and the low potential wiring 16 may be short-circuited. For this reason, at timing t2 in the middle of the period of the state T4, the upper MOSFET 32 is switched from the on state to the off state. Even though the upper MOSFET 32 is turned off, the current IL1 continuously flows through the diode 42. After the upper MOSFET 32 is turned off, the current IL1 decreases to zero. In a case where the current IL1 decreases to zero, the state T5 is brought.

In the state T5, the lower MOSFET 33 is maintained in the on state, and the current IL2 continuously flows. In a period of the state T5, since the induction voltage of the main reactor 22 and the induction voltage (the induction voltage that is applied in the direction of blocking the current IL2) of the second sub-reactor 26 fall, the current IL2 gradually increases in the period of the state T5. For this reason, the current IL also gradually increases. At the end of the period of the state T5, the lower MOSFET 33 is switched from the on state to the off state. With the above, the DC-DC converter 10 makes transition from the state T5 to the state T6.

At the beginning of a period of the state T6, the upper MOSFET 34 is turned off. In a case where the lower MOSFET 33 is turned off at the beginning of the state T6, the main reactor 22 and the second sub-reactor 26 generate the induction voltages in a direction of allowing the current IL2 to continuously flow; thus, the potential of the anode of the diode 44 rises. For this reason, the current IL2 flows from the high potential input wiring 12 to the high potential output wiring 14 through the main reactor 22, the second sub-reactor 26, and the diode 44. The current IL2 flows to the high potential output wiring 14 as described above, whereby the output-side smoothing capacitor 50 (see FIG. 1) is charged and the potential on the high potential output wiring 14 rises. In the period of the state T6, since the induction voltages (the induction voltages that are applied in a direction of allowing the current IL2 to flow) of the main reactor 22 and the second sub-reactor 26 fall, the current IL2 gradually decreases in the period of the state T6. For this reason, the current IL also gradually decreases.

At timing t3 in the middle of the period of the state T6, the upper MOSFET 34 is switched from the off state to the on state. In a case where the upper MOSFET 34 is turned on, the current IL2 is branched and flows into the diode 44 and the upper MOSFET 34. With the above, the current density of the diode 44 is lowered, and loss that is generated due to the current IL2 becomes relatively small. In more detail, loss that is generated in the diode 44 and the upper MOSFET 34 when the current IL2 is branched and flows into the diode 44 and the upper MOSFET 34 becomes smaller than loss that is generated in the diode 44 when the upper MOSFET 34 is turned off and the current IL2 flows in the diode 44. As described above, the upper MOSFET 34 is turned on when the current IL2 flows in the diode 44, whereby it is possible to more effectively reduce loss. In particular, in a case where a body diode of the upper MOSFET 34 is used as the diode 44, the current density of the diode 44 is likely to become high. Accordingly, the upper MOSFET 34 is turned on to lower the current density of the diode 44, whereby it is possible to effectively suppress loss. At the end of the period of the state T6, the lower MOSFET 31 is switched from the off state to the on state. With the above, the DC-DC converter 10 makes transition from the state T6 to the above-described state T1.

At the beginning of the period of the state T1, the upper MOSFET 34 is maintained in the on state. That is, at the beginning of the period of the state T1, both of the lower MOSFET 31 and the upper MOSFET 34 are turned on. For this reason, the high potential output wiring 14 and the low potential wiring 16 are connected through the upper MOSFET 34, the second sub-reactor 26, the first sub-reactor 24, and the lower MOSFET 31. However, since the voltage between the high potential output wiring 14 and the low potential wiring 16 is retained with the first sub-reactor 24 and the second sub-reactor 26, an overcurrent does not flow between the high potential output wiring 14 and the low potential wiring 16. That is, the high potential output wiring 14 and the low potential wiring 16 are not brought into a short-circuit state.

As described above, in the state T1, since the lower MOSFET 31 is turned on, the current IL1 flows from the high potential input wiring 12 to the low potential wiring 16 through the main reactor 22, the first sub-reactor 24, and the lower MOSFET 31. As described above, the current IL1 rapidly increases in the period of the state T1. In the period of the state T1, the current IL2 flows continuously from the period of the state T6. However, in the period of the state T1, since the lower MOSFET 31 is turned on and the potential on the second terminal 22b of the main reactor 22 rapidly falls, the current IL2 rapidly decreases. Accordingly, in the state T1, the current IL hardly changes.

At the beginning of the period of the state T1, since the upper MOSFET 34 is turned on, the current IL2 is branched and flows into the diode 44 and the upper MOSFET 34. With the above, loss that is generated when the current IL2 flows is more effectively reduced. However, in a case where the on time of the upper MOSFET 34 is excessively long, a current may flow back to the upper MOSFET 34, and the high potential output wiring 14 and the low potential wiring 16 may be short-circuited. For this reason, at timing t4 in the middle of the period of the state T1, the upper MOSFET 34 is switched from the on state to the off state. Even though the upper MOSFET 34 is turned off, the current IL2 continuously flows through the diode 44. After the upper MOSFET 34 is turned off, the current IL2 decreases to zero.

As described above, in the first operation, the cycle of the states T1 to T6 is repeated multiple times. In Example 1, when transition is made from the state T3 to the state T4, the upper MOSFET 32 is maintained in the on state from timing t1 in the middle of the period of the state T3 to timing t2 in the middle of the period of the state T4. With the above, loss that is generated when the current IL1 flows is more effectively reduced. In particular, in Example 1, both of the upper MOSFET 32 and the lower MOSFET 33 are brought into the on state at the beginning of the period of the state T4. However, since the voltage between the high potential output wiring 14 and the low potential wiring 16 is retained with the first sub-reactor 24 and the second sub-reactor 26, short-circuit between the high potential output wiring 14 and the low potential wiring 16 is restrained. The upper MOSFET 32 is maintained in the on state until timing t2 in the middle of the period of the state T4, whereby it is possible to extend the period during which the upper MOSFET 32 is in the on state. Accordingly, it is possible to more effectively reduce loss that is generated when the current IL1 flows.

In Example 1, when transition is made from the state T6 to the state T1, the upper MOSFET 34 is maintained in the on state from timing t3 in the middle of the period of the state T6 to timing t4 in the middle of the period of the state T1. With the above, loss that is generated when the current IL2 flows is more effectively reduced. In particular, in Example 1, both of the upper MOSFET 34 and the lower MOSFET 31 are brought into the on state at the beginning of the period of the state T1. However, since the voltage between the high potential output wiring 14 and the low potential wiring 16 is retained with the first sub-reactor 24 and the second sub-reactor 26, short-circuit between the high potential output wiring 14 and the low potential wiring 16 is restrained. The upper MOSFET 34 is maintained in the on state until timing t4 in the middle of the period of the state T1, whereby it is possible to extend the period during which the upper MOSFET 34 is in the on state, and to more effectively reduce loss that is generated when the current IL2 flows.

In the first operation, as shown in FIG. 3, fluctuation amplitude ΔIL of the current IL is relatively small. For this reason, loss that is generated in the main reactor 22 is relatively small. In the first operation, fluctuation amplitude ΔiL1, ΔIL2 of the currents IL1, IL2 are relatively large. However, since the inductance of each of the first sub-reactor 24 and the second sub-reactor 26 is relatively small, loss that is generated in each of the first sub-reactor 24 and the second sub-reactor 26 is relatively small. As described above, in the first operation, it is possible to effectively suppress loss that is generated in each reactor.

Figure 5:
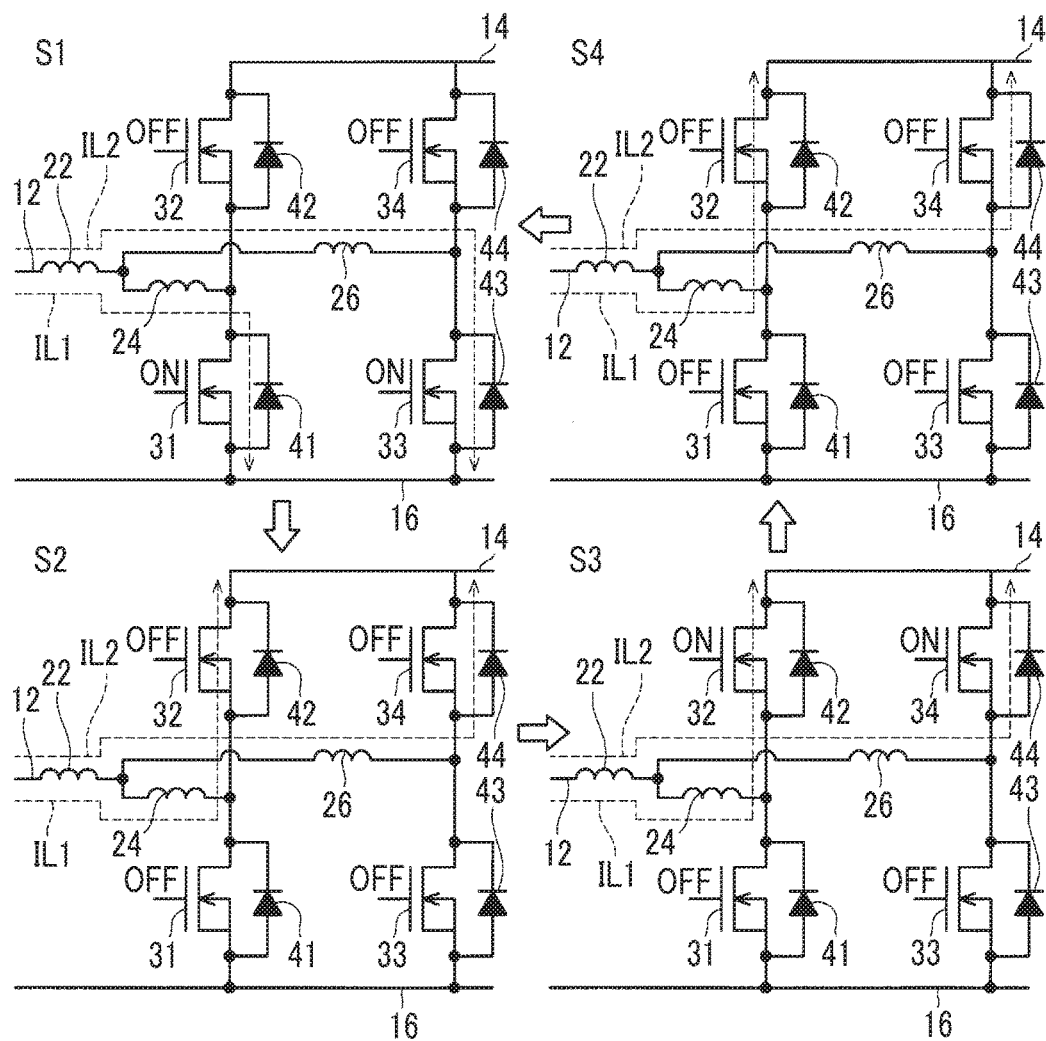
FIG. 5 is a diagram showing change in a state of the DC-DC converter in a second operation.

The second operation will be described. As shown in FIG. 5, in the second operation, the gate controller 54 performs control such that the state of the DC-DC converter 10 changes in an order of a state S1, a state S2, a state S3, and a state S4, and returns to the state S1 next to the state S4. That is, the gate controller 54 performs control such that the cycle of the states S1 to S4 is repeated.

In the state S1, both of the lower MOSFET 31 and the lower MOSFET 33 are turned on, and both of the upper MOSFET 32 and the upper MOSFET 34 are turned off. For this reason, the current IL1 flows from the high potential input wiring 12 to the low potential wiring 16 through the main reactor 22, the first sub-reactor 24, and the lower MOSFET 31, and the current IL2 flows from the high potential input wiring 12 to the low potential wiring 16 through the main reactor 22, the second sub-reactor 26, and the lower MOSFET 33. In a period of the state S1, since the induction voltages (the induction voltages that are applied in the directions of blocking the currents IL1, IL2) of the reactors gradually fall, the currents IL1, IL2 gradually increase. At the end of the period of the state S1, the lower MOSFET 31 and the lower MOSFET 33 are switched from the on state to the off state. With the above, the DC-DC converter 10 makes transition from the state S1 to the state S2.

In a case where the lower MOSFET 31 and the lower MOSFET 33 are turned off at the beginning of the state S2, the main reactor 22 and the first sub-reactor 24 generate the induction voltages in a direction of allowing the current IL1 to continuously flow, and the main reactor 22 and the second sub-reactor 26 generate the induction voltages in a direction of allowing the current IL2 to continuously flow. Since the potential on the anode of the diode 42 rises with the induction voltages of the main reactor 22 and the first sub-reactor 24, the current IL1 flows in the diode 42. That is, the current IL1 flows from the high potential input wiring 12 to the high potential output wiring 14 through the main reactor 22, the first sub-reactor 24, and the diode 42. Since the potential on the anode of the diode 44 rises with the induction voltages of the main reactor 22 and the second sub-reactor 26, the current IL2 flows in the diode 44. That is, the current IL2 flows from the high potential input wiring 12 to the high potential output wiring 14 through the main reactor 22, the second sub-reactor 26, and the diode 44. The currents IL1, IL2 flow as described above, whereby the output-side smoothing capacitor 50 (see FIG. 1) is charged and the potential on the high potential output wiring 14 rises. At the end of a period of the state S2, the upper MOSFET 32 and the upper MOSFET 34 are switched from the off state to the on state. With the above, the DC-DC converter 10 makes transition from the state S2 to the state S3.

Even in the state S3, the current IL1 flows through the diode 42 and the current IL2 flows through the diode 44. The upper MOSFET 32 is turned on, whereby the current IL1 is branched and flows into the upper MOSFET 32 and the diode 42. With the above, loss that is generated when the current IL1 flows is more effectively reduced. The upper MOSFET 34 is turned on, whereby the current IL2 is branched and flows into the upper MOSFET 34 and the diode 44. With the above, loss that is generated when the current IL2 flows is more effectively reduced. At the end of the period of the state S3, the upper MOSFET 32 and the upper MOSFET 34 are switched from the on state to the off state. With the above, the DC-DC converter 10 makes transition from the state S3 to the state S4.

Even in the state S4, similarly to the state S2, the current IL1 flows through the diode 42 and the current IL2 flows through the diode 44. At the end of a period of the state S4, the lower MOSFET 31 and the lower MOSFET 33 are switched from the off state to the on state. With the above, the DC-DC converter 10 makes transition from the state S4 to the state S1.

In the period of the states S2, S3, S4, since the induction voltages (the induction voltages that are applied in directions of allowing the currents IL1, IL2 to flow) of the reactors gradually fall, the currents IL1, IL2 gradually decrease.

As described above, in the second operation, a state (state S1) in which both of the lower MOSFETs 31, 33 are turned on and a state (states S2, S3, S4) in which both of the lower MOSFETs 31, 33 are turned off are alternately repeated. Even in the second operation, it is possible to raise the potential on the high potential output wiring 14.

Figure 6:
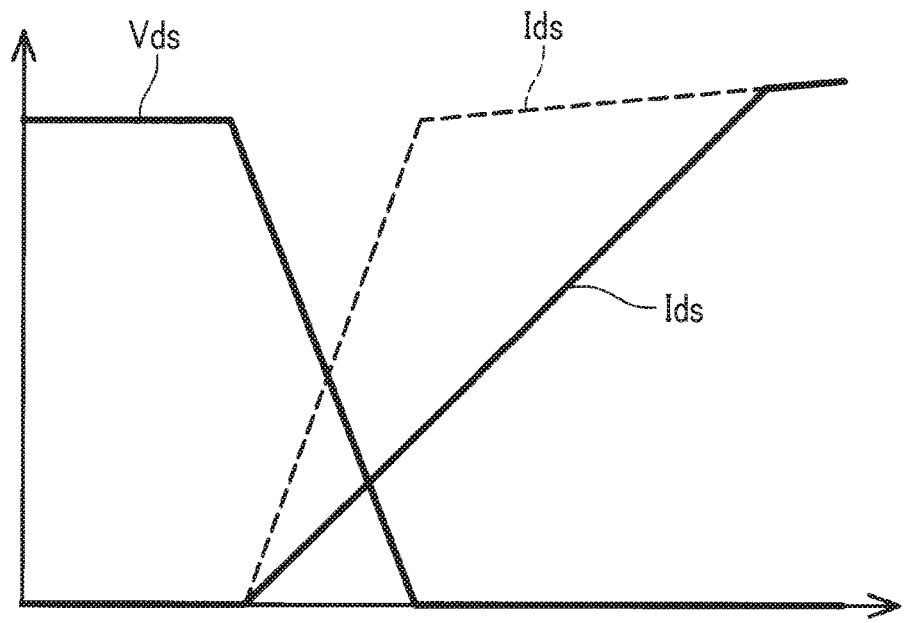

FIG. 6 shows change in a drain-source voltage Vds and a drain-source current Ids when the lower MOSFETs 31, 33 are turned on. In FIG. 6, a solid-line graph of the current Ids shows change in the current Ids in the first operation. A broken-line graph of the current Ids shows change in the current Ids in the second operation. In both of the first operation and the second operation, in a case where the lower MOSFETs 31, 33 are turned on, the voltage Vds rapidly falls, and the current Ids rapidly increases. In both of the first operation and the second operation, after the lower MOSFETs 31, 33 are turned on, as described above, the current Ids (that is, the current IL1 or IL2) gradually increases.

As shown in FIG. 5, in the second operation, in a state (state S4) immediately before the lower MOSFET 31 is turned on, the current IL1 flows in the main reactor 22 and the first sub-reactor 24. For this reason, the current IL1 flows from the main reactor 22 and the first sub-reactor 24 into the lower MOSFET 31 substantially at the same time the lower MOSFET 31 is turned on. For this reason, in the second operation, as shown in the broken-line graph of the current Ids of FIG. 6, an increase rate of the current Ids when the lower MOSFET 31 is turned on is relatively high. Accordingly, in the second operation, loss (switching loss) that is generated when the lower MOSFET 31 is turned on is relatively large. Similarly, in the second operation, switching loss that is generated when the lower MOSFET 33 is turned on is relatively large.

As shown in FIG. 4, in the first operation, in a state (state T6) immediately before that the lower MOSFET 31 is turned on, the current IL1 does not flow in the first sub-reactor 24. For this reason, while the current IL1 starts to flow in the lower MOSFET 31 at the same time the lower MOSFET 31 is turned on, an increase rate of the current IL1 is not comparatively high. For this reason, in the first operation, as shown in the solid-line graph of the current Ids of FIG. 6, the increase rate of the current Ids when the lower MOSFET 31 is turned on is lower than in the second operation. Accordingly, in the first operation, switching loss that is generated when the lower MOSFET 31 is turned on is relatively small. Similarly, in the first operation, switching loss that is generated when the lower MOSFET 33 is turned on is relatively small.

As described above, in the first operation, it is possible to suppress switching loss that is generated in the lower MOSFETs 31, 33, compared to the second operation.

In both of the first operation and the second operation, when the lower MOSFETs 31, 33 are turned on, the potentials on the anodes of the diodes 42, 44 fall, and a reverse voltage is applied to the diodes 42, 44. In a case where an application voltage to the diodes 42, 44 is switched from a forward voltage to a reverse voltage, a recovery current (a reverse current that flows within a short time) flows in the diodes 42, 44. In a case where the recovery current flows, recovery loss (a kind of switching loss) is generated in the diodes 42, 44.

As shown in FIG. 5, in the second operation, when transition is made from the state S4 to the state S1, the potentials on the anodes of the diodes 42, 44 are lowered from a high potential (a potential higher than the potential on the high potential output wiring 14) to a low potential (the potential on the low potential wiring 16). That is, the application voltage to the diodes 42, 44 is switched from a forward voltage to a reverse voltage. For this reason, recovery loss is generated in the diodes 42, 44.

As shown in FIG. 4, in the first operation, when the lower MOSFET 31 is turned on (that is, when transition is made from the state T6 to the state T1), a current does not flow in the diode 42; thus, recovery loss is not generated in the diode 42. In a case where the lower MOSFET 31 is turned on, the potential on the anode of the diode 44 is lowered through the first sub-reactor 24 and the second sub-reactor 26. However, a decrease rate of the potential on the anode of the diode 44 is low with the influence of the induction voltages of the first sub-reactor 24 and the second sub-reactor 26. Accordingly, recovery loss is hardly generated even in the diode 44. Similarly, when the lower MOSFET 33 is turned on (that is, when transition is made from the state T3 to the state T4), a current does not flow in the diode 44; thus, recovery loss is not generated in the diode 44. For this reason, since the potential on the anode of the diode 42 falls slowly with the influence of the induction voltages of the first sub-reactor 24 and the second sub-reactor 26, recovery loss is hardly generated even in the diode 42.

As described above, in the first operation, it is possible to suppress recovery loss (a kind of switching loss) that is generated in the diodes 42, 44, compared to the second operation.

As described above referring to FIG. 4, in the first operation, the lower MOSFET 31 is brought into the on state alone in the states T1, T2, and the lower MOSFET 33 is brought into the on state alone in the states T4, T5. Steady loss $E_{on1}$ that is generated when the lower MOSFET 31 (or 33) is turned on alone satisfies a relationship of $E_{on1} \cong R_{on} IL^2$ in a case where on resistance of the lower MOSFET 31 (or 33) is $R_{on}$. In contrast, as described above referring to FIG. 5, in the second operation, since both of the lower MOSFETs 31, 33 are brought into the on state in the state S1, the current IL is branched and flows into the lower MOSFET 31 and the lower MOSFET 33. Accordingly, steady loss $E_{on2}$ that is generated at this time satisfies a relationship of $E_{on2} \cong R_{on}(IL/2)^2 + R_{on}(IL/2)^2 = R_{on}IL^2/2$. That is, a relationship of $E_{on2} \cong E_{on1}/2$ is satisfied. That is, in the second operation, steady loss is hardly generated, compared to the first operation.

Figure 7:
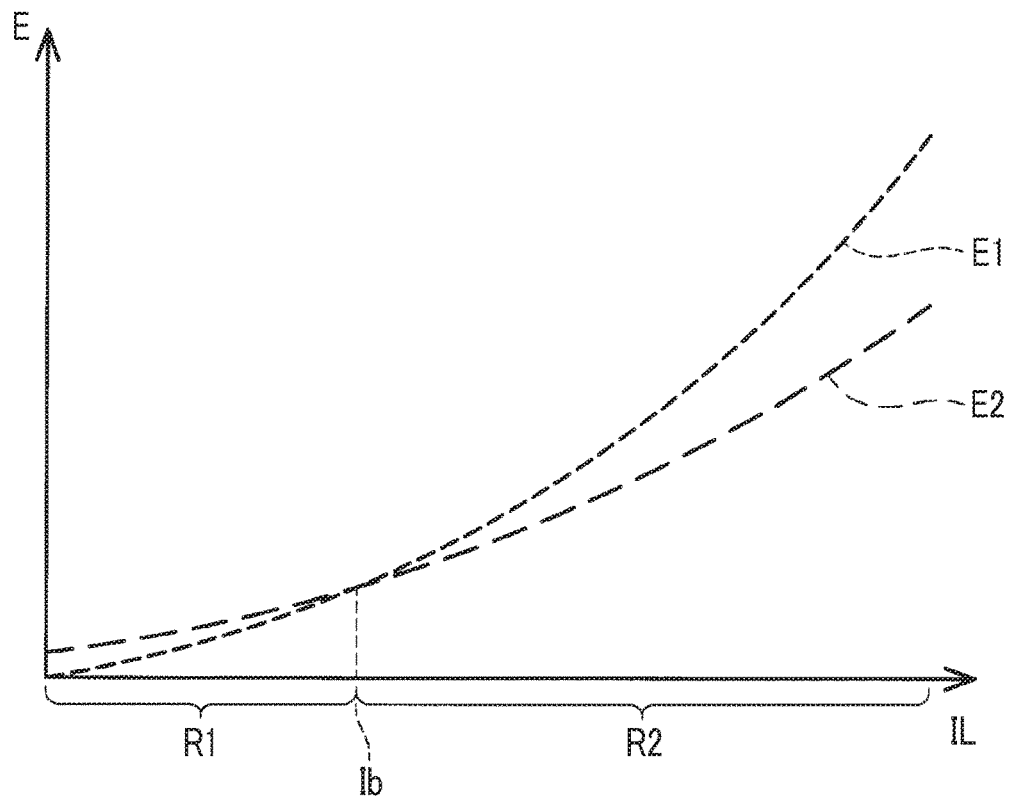
FIG. 7 is a graph showing the relationship between loss E and a current IL.

FIG. 7 shows the relationship between loss E and the current IL. The loss E shown in FIG. 7 indicates total loss that is generated in the DC-DC converter 10. The loss E includes steady loss and switching loss. A graph E1 of FIG. 7 shows loss that is generated in the first operation, and a graph E2 of FIG. 7 shows loss that is generated in the second operation. As described above, the first operation has a relatively high effect of suppressing switching loss. In a current domain R1 where the current IL is relatively small, the ratio of switching loss to total loss is relatively large; thus, the loss E1 in the first operation with a relatively high effect of suppressing switching loss becomes smaller than the loss E2 in the second operation. In a current domain R2 where the current IL is relatively large, the ratio of steady loss to total loss is relatively large; thus, the loss E2 in the second operation with a relatively high effect of suppressing steady loss becomes smaller than the loss E1 in the first operation. As described above, the gate controller 54 executes the first operation when the current IL is equal to or smaller than the threshold Ith, and executes the second operation when the current IL is greater than the threshold Ith. The threshold Ith is set to satisfy a relationship of $0.9 \times Ib < Ith < 1.1 \times Ib$ with respect to a boundary value Ib between the current domain R1 and the current domain R2. That is, the threshold Ith is set to a value that substantially coincides with the boundary value Ib. Accordingly, the DC-DC converter 10 of Example 1 can execute the first operation in the current domain R1, and can execute the second operation in the current domain R2. Accordingly, loss that is generated in the DC-DC converter 10 is effectively suppressed. The current IL is a value within the current domain R1 at the time of normal vehicle traveling, and the current IL becomes a value within the current domain R2 in a case where the vehicle is in sudden acceleration, or the like. Accordingly, the DC-DC converter 10 executes the first operation at the time of normal vehicle traveling, and the DC-DC converter 10 executes the second operation in a case where the vehicle is in sudden acceleration, or the like.

As described above, in a case where the current IL becomes large, switching is made from the first operation (that is, an operation that the lower MOSFET 31 and the lower MOSFET 33 are turned on alternately) to the second operation (that is, an operation that the lower MOSFET 31 and the lower MOSFET 33 are turned on and off simultaneously). When switching is made from the first operation to the second operation, the current IL1 and the current IL2 (the current IL1 and the current IL2 in the state S1 of FIG. 5) are unbalanced. However, since the first sub-reactor 24 and the second sub-reactor 26 have relatively small inductance, the current IL1 and the current IL2 are balanced within a short time in a case where the second operation starts. Accordingly, it is possible to execute the second operation without any problems.

In Example 1 described above, as shown in FIG. 5, in the second operation, the lower MOSFETs 31, 33 and the upper MOSFETs 32, 34 are alternately turned on. However, as shown in FIG. 8, in the second operation, the state S1 and the state S2 may be made to appear alternately, and the upper MOSFETs 32, 34 may be maintained in the off state.

Figure 9:
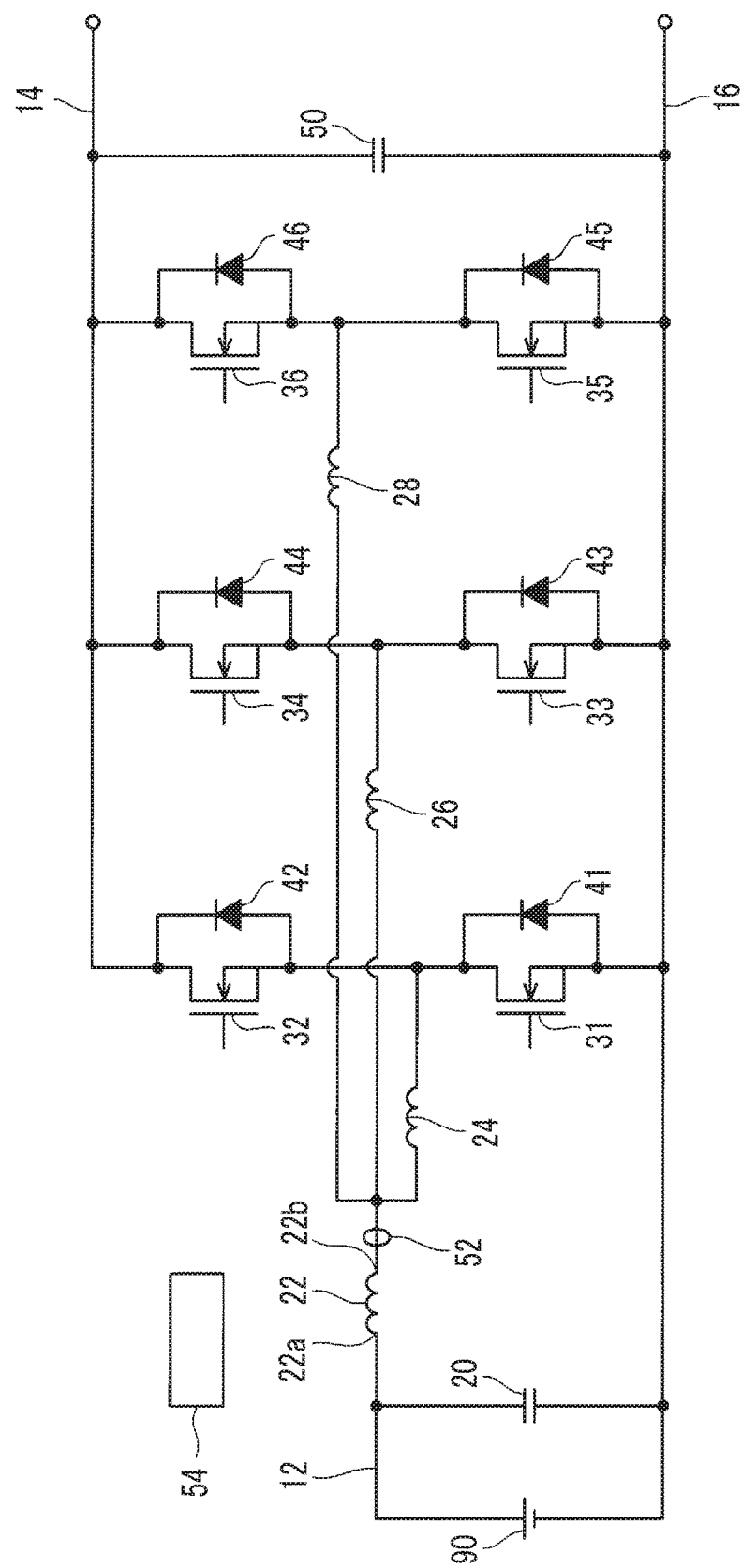
FIG. 9 is a circuit diagram of a DC-DC converter of a second modification example.
Figure 10:
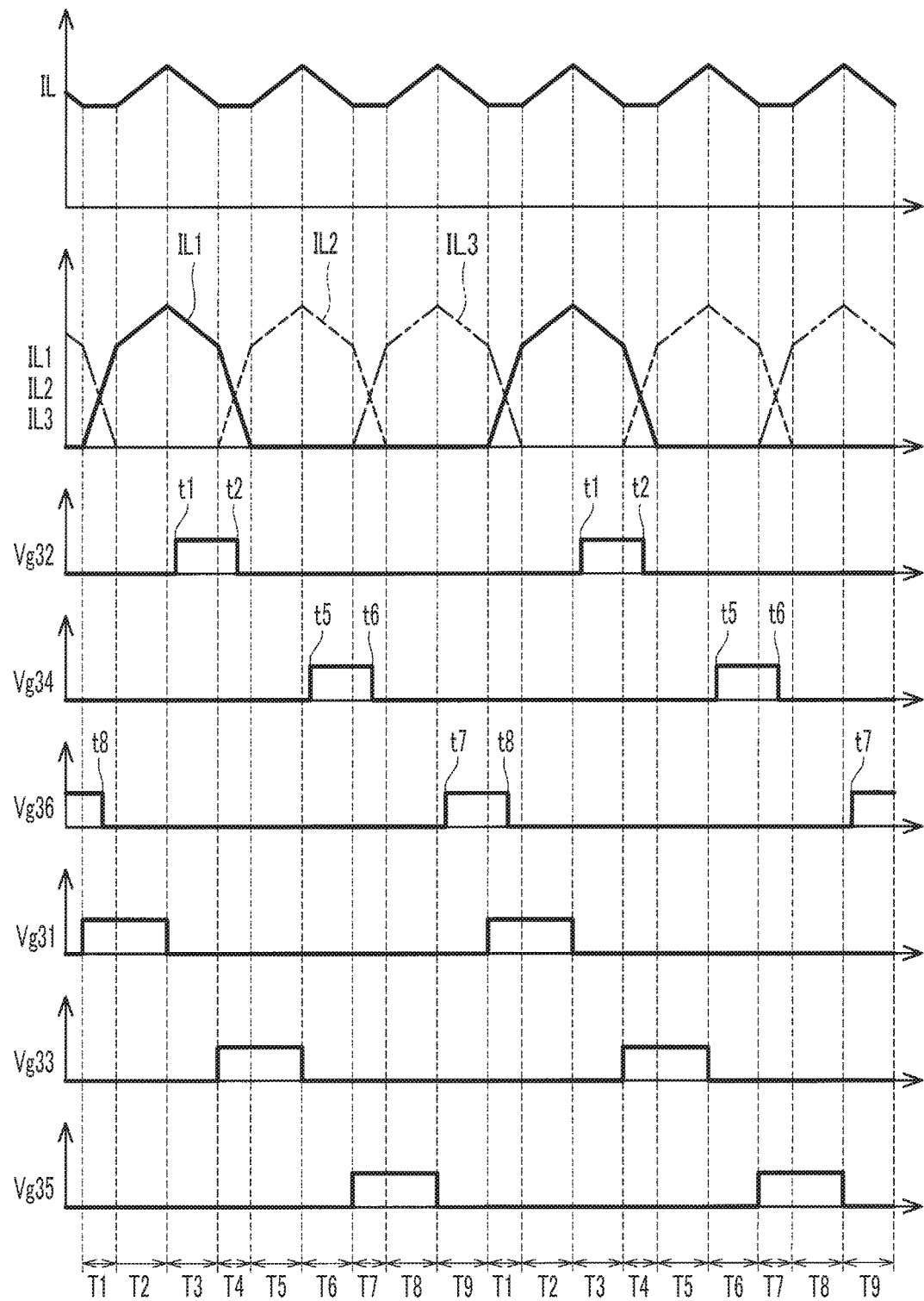
FIG. 10 is a graph showing change of respective values in a first operation in the DC-DC converter of the second modification example.

As shown in FIG. 9, a lower MOSFET 35, a diode 45, an upper MOSFET 36, a diode 46, and a third sub-reactor 28 may be additionally provided. The MOSFETs 35, 36 are of an n-channel type. A source of the lower MOSFET 35 is connected to the low potential wiring 16. A source of the upper MOSFET 36 is connected to a drain of the lower MOSFET 35. A drain of the upper MOSFET 36 is connected to the high potential output wiring 14. A first end of the third sub-reactor 28 is connected to the second terminal 22b of the main reactor 22. A second end of the third sub-reactor 28 is connected to the drain of the lower MOSFET 35 and the source of the upper MOSFET 36. An anode of the diode 45 is connected to the source of the lower MOSFET 35. A cathode of the diode 45 is connected to the drain of the lower MOSFET 35. An anode of the diode 46 is connected to the source of the upper MOSFET 36. A cathode of the diode 46 is connected to the drain of the upper MOSFET 36. In this case, in the first operation, as shown in FIG. 10, control can be performed such that the state of the DC-DC converter 10 changes in an order of states T1 to T9, and returns to the state T1 next to the state T9. That is, the cycle of the states T1 to T9 may be repeatedly executed. In FIG. 10, a current IL3 is a current that flows in the third sub-reactor 28. A potential Vg35 is a gate potential of the lower MOSFET 35. A potential Vg36 is a gate potential of the upper MOSFET 36. In the states T1 to T6 of FIG. 10, the lower MOSFET 35 is turned off. In the states T7, T8, the lower MOSFETs 31, 33 are turned off, and the lower MOSFET 35 is turned on. In the state T9, the lower MOSFETs 31, 33, 35 are turned off. The upper MOSFET 34 is brought into the on state from timing t5 in the middle of a period of the state T6 to timing t6 in the middle of a period of the state T7. With the above, loss that is generated when the current IL2 flows is more effectively reduced. The upper MOSFET 36 is brought into the on state from timing t7 in the middle of a period of the state T9 to timing t8 in the middle of a period of the state T1. With the above, loss that is generated when the current IL3 flows is more effectively reduced. As described above, even though the number of series circuits of the upper MOSFET and the lower MOSFET is three, it is possible to execute the first operation. The number of series circuits of the upper MOSFET and the lower MOSFET may be increased more than that in FIG. 9.

In Example 1 described above, the current sensor 52 detects the current IL that flows in the main reactor 22. However, a current sensor that measures a current flowing at a different position (for example, at least one of the high potential input wiring 12, the first sub-reactor 24, the second sub-reactor 26, the MOSFETs 31 to 34, and the diodes 41 to 44) may be provided, the current IL may be predicted from a detection value of the current sensor, and the first operation and the second operation may be switched.

The first operation and the second operation of Example 1 may be applied to a regenerative operation (an operation of charging the direct current power supply 90 using surplus electric power of the high potential output wiring 14) of the DC-DC converter. In this case, it is possible to effectively suppress switching loss in the upper MOSFETs 32, 34 with the first operation.

Figure 11:
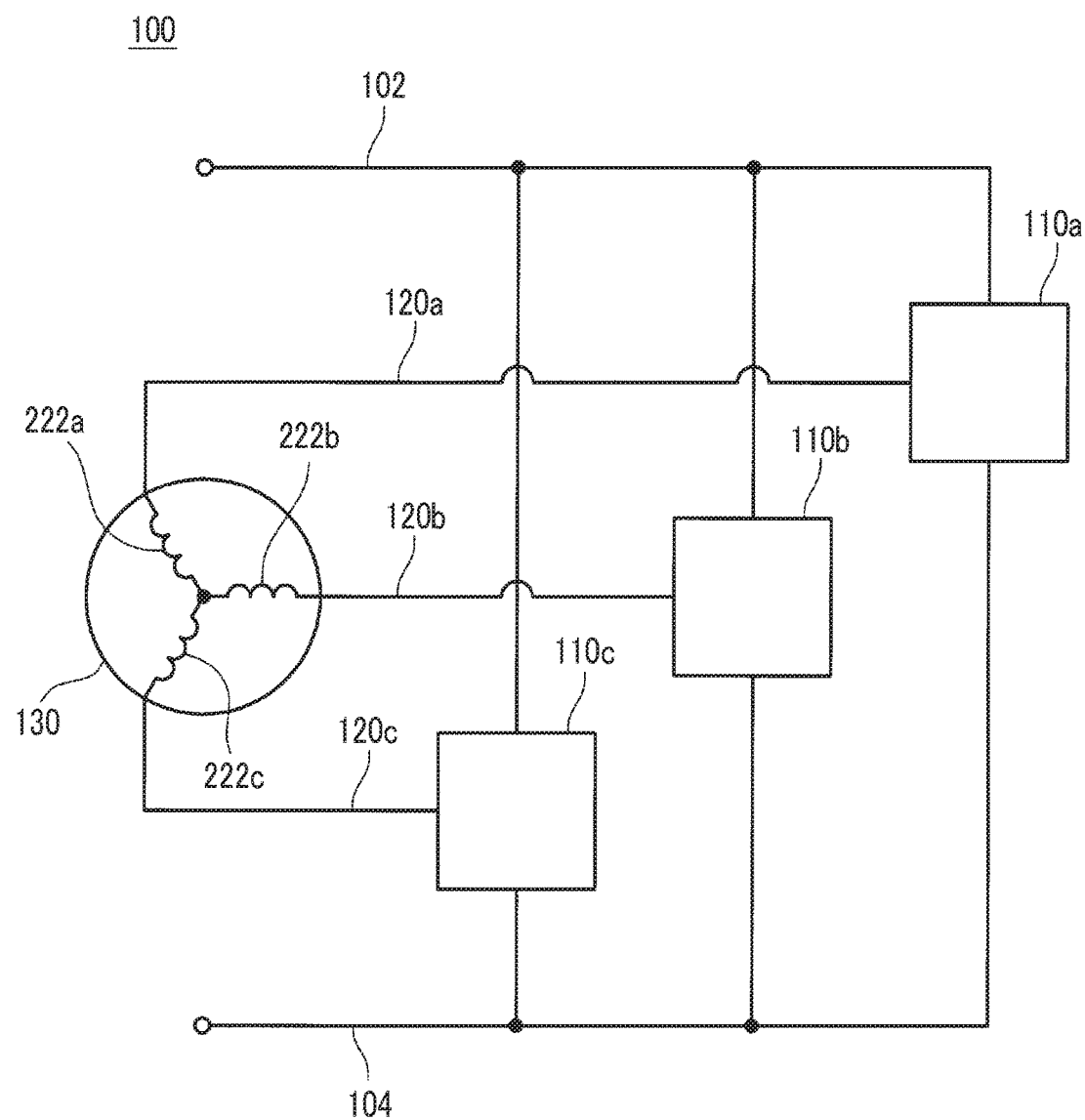
FIG. 11 is a circuit diagram of an inverter.

In Example 1, the DC-DC converter has been described. In contrast, in Example 2, an example where the technique of the present disclosure is applied to an inverter will be described. An inverter 100 shown in FIG. 11 includes a high potential wiring 102 and a low potential wiring 104. The high potential wiring 102 is connected to a plus side (for example, a positive electrode of a battery, a high potential output wiring of a DC-DC converter, or the like) of a direct current power supply. The low potential wiring 104 is connected to a minus side (for example, a negative electrode of a battery, a low potential wiring of a DC-DC converter, or the like) of the direct current power supply. Three switching circuits 110*a*, 110*b*, 110*c* are connected in parallel between the high potential wiring 102 and the low potential wiring 104. Motor wirings 120*a*, 120*b*, 120*c* are connected to the switching circuits 110*a*, 110*b*, 110*c*, respectively. Another end of the motor wirings 120*a*, 120*b*, 120*c* is connected to a motor (three-phase motor) 130 for traveling. The motor 130 for traveling 130 has three coils 222*a*, 222*b*, 222*c*. The motor wiring 120*a* is connected to the coil 222*a*. The motor wiring 120*b* is connected to the coil 222*b*. The motor wiring 120*c* is connected to the coil 222*c*. The inverter 100 converts direct current electric power applied between the high potential wiring 102 and the low potential wiring 104 to three-phase alternating current electric power and supplies three-phase alternating current electric power to the motor 130 for traveling.

The switching circuits 110*a*, 110*b*, 110*c* will be described. Since the switching circuits 110*a*, 110*b*, 110*c* have the same configuration, hereinafter, the switching circuit 110*c* will be described.

Figure 12:
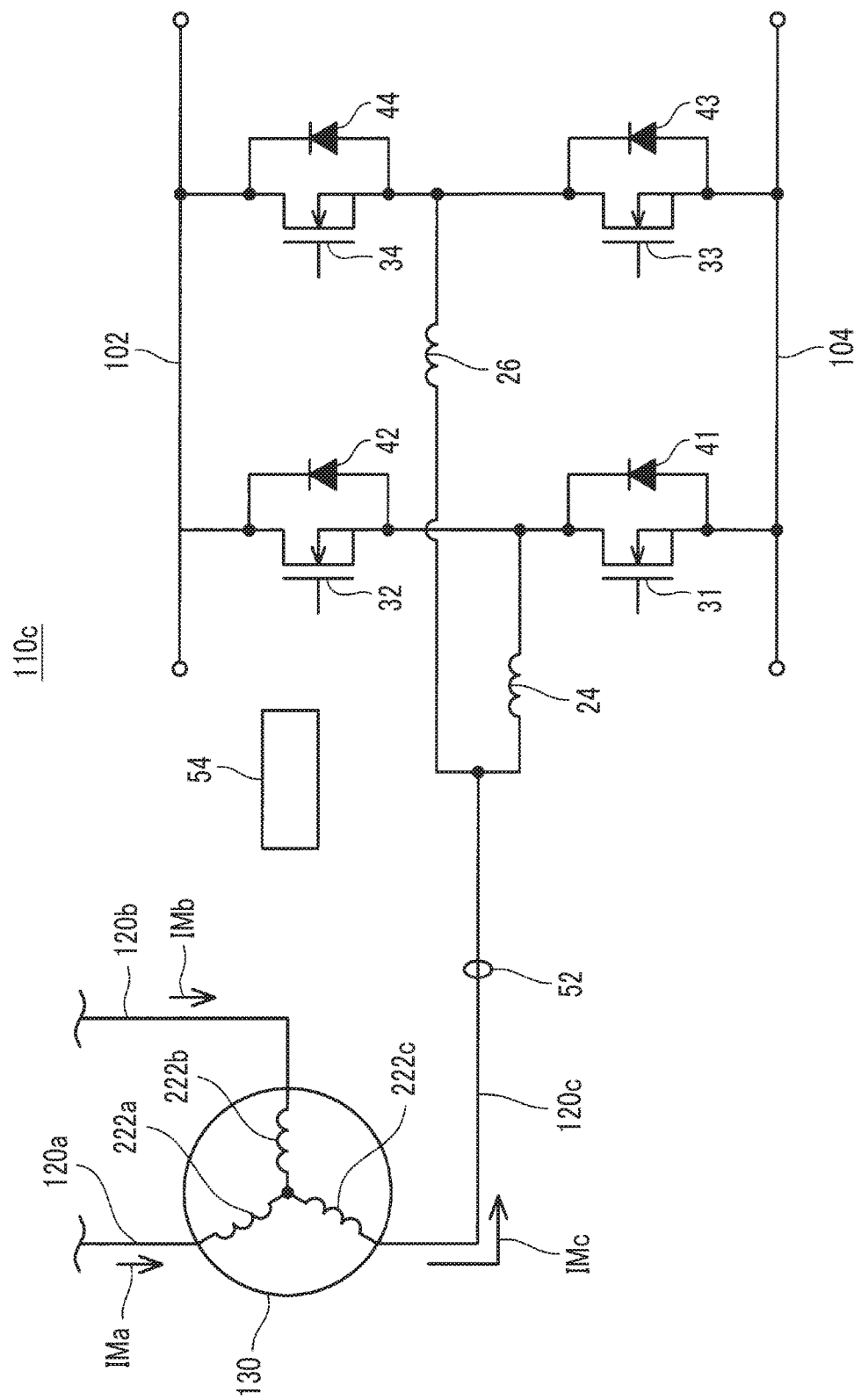
FIG. 12 is a circuit diagram of a switching circuit.

FIG. 12 shows the switching circuit 110*c*. Hereinafter, the constituent elements of the DC-DC converter of Example 1 among constituent elements of the switching circuit 110*c* are represented by the same reference numerals as those in Example 1. The switching circuit 110*c* has MOSFETs 31 to 34. Between a high potential wiring 102 and a low potential wiring 104, the upper MOSFET 32 and the lower MOSFET 31 are connected in series, and the upper MOSFET 34 and the lower MOSFET 33 are connected in series. Diodes 41 to 44 are connected in parallel with the MOSFETs 31 to 34, respectively. In the diodes 41 to 44, an anode is connected to a source of the corresponding MOSFET, and a cathode is connected to a drain of the corresponding MOSFET. The switching circuit 110*c* has a first sub-reactor 24 and a second sub-reactor 26. A first end of the first sub-reactor 24 is connected to a drain of the lower MOSFET 31. A second end of the first sub-reactor 24 is connected to the motor wiring 120*c*. A first end of the second sub-reactor 26 is connected to a drain of the lower MOSFET 33. A second end of the second sub-reactor 26 is connected to the motor wiring 120*c*. The motor wiring 120*c* is provided with a current sensor 52. The switching circuit 110*c* has a gate controller 54 that is connected to gates of the MOSFETs 31 to 34.

The switching circuits 110*a* to 110*c* switch the MOSFETs inside the switching circuits 110*a* to 110*c*, whereby alternating current electric power is supplied to the motor 130 for traveling. Currents IMa, IMb, IMc of FIG. 12 indicate currents that flow in the motor 130 for traveling. FIG. 12 shows a case where the current IMa flows from the motor wiring 120*a* to the coil 222*a*, the current IMb flows from the motor wiring 120*b* to the coil 222*b*, and the current IMc flows from the coil 222*c* to the motor wiring 120*c*. The current IMc is a current obtained by adding the current IMa and the current IMb. As described above, in a state in which the currents IMa, IMb, IMc flow, the gate controller 54 switches the MOSFETs 31 to 34, thereby controlling the current IMc. The gate controller 54 executes a first operation when the current IMc detected by the current sensor 52 is equal to or smaller than a threshold Ith, and executes a second operation when the current IMc is greater than the threshold Ith.

Figure 13:
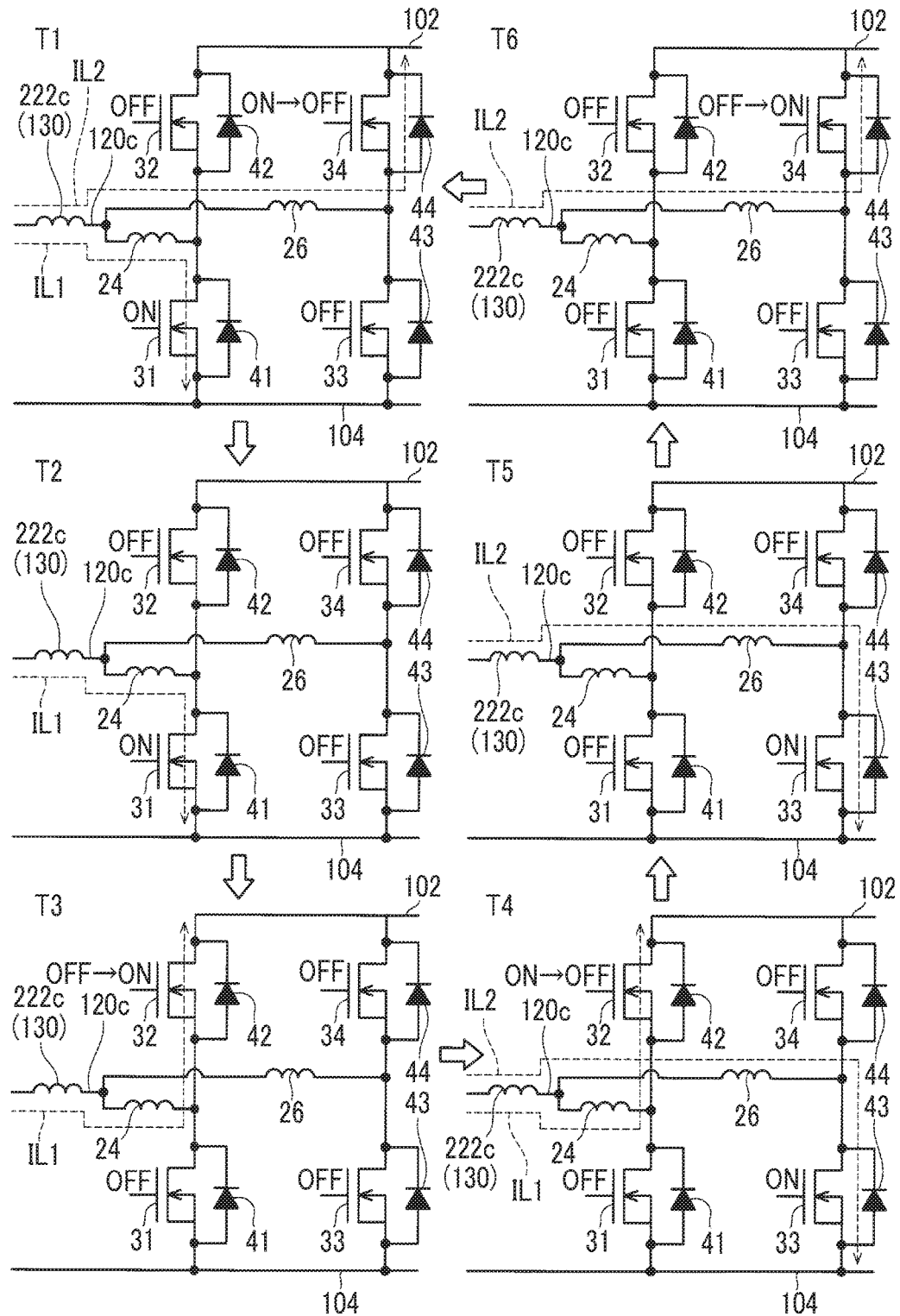
FIG. 13 is a diagram showing change in a state of the switching circuit in a first operation.

The first operation of the switching circuit 110*c* is substantially the same as the first operation of FIG. 3. In regard to the switching circuit 110*c*, FIG. 3 shows the current IMc instead of the current IL. State T1 to T6 of the switching circuit 110*c* are shown in FIG. 13. The current IMc is equal to a value obtained by adding the current IL1 and the current IL2. In FIG. 13, the circuit configuration of the switching circuit 110*c* is simplified compared to that shown in FIG. 12.

A first operation of the switching circuit 110*c* shown in FIG. 13 is substantially the same as the first operation of the DC-DC converter 10 shown in FIG. 4. In the state T1, the current IL1 flows through the lower MOSFET 31 in the on state. In the state T1, the current IL2 flows in the diode 44. However, the current IL2 decreases to zero in a period of the state T1. In the state T2, since the lower MOSFET 31 is subsequently turned on, the current IL1 continuously flows in the lower MOSFET 31. In the state T3, the lower MOSFET 31 is turned off, and the current IL1 flows in the diode 42. At timing t1 in the middle of a period of the state T3, the upper MOSFET 32 is turned on. In the state T4, the lower MOSFET 33 is turned on, and the current IL2 flows in the lower MOSFET 33. The upper MOSFET 32 is continuously turned on until timing t2 in the middle of a period of the state T4. A voltage between the high potential wiring 102 and the low potential wiring 104 is retained with the first sub-reactor 24 and the second sub-reactor 26. Accordingly, the high potential wiring 102 and the low potential wiring 104 are not brought into a short-circuit state. The upper MOSFET 32 is turned on from timing t1 to timing t2, whereby the current IL1 is dispersed and flows into the diode 42 and the upper MOSFET 32 from the period of the state T3 to the period of the state T4. With the above, steady loss is effectively suppressed. The current IL1 decreases to zero in the period of the state T4. In the state T5, since the lower MOSFET 33 is subsequently turned on, the current IL2 continuously flows in the lower MOSFET 33. In the state T6, the lower MOSFET 33 is turned off, and the current IL2 flows in the diode 44. At timing t3 in the middle of a period of the state T6, the upper MOSFET 34 is turned on. In the subsequent state T1, the lower MOSFET 31 is turned on, and the current IL1 flows in the lower MOSFET 31. The upper MOSFET 34 is continuously turned on until timing t4 in the middle of the period of the state T1. The voltage between the high potential wiring 102 and the low potential wiring 104 is retained with the first sub-reactor 24 and the second sub-reactor 26. Accordingly, the high potential wiring 102 and the low potential wiring 104 are not brought into the short-circuit state. The upper MOSFET 34 is turned on from timing t3 to timing t4, the current IL2 is dispersed and flows into the diode 44 and the upper MOSFET 34 from the period of the state T6 to the period of the state T1. With the above, steady loss is effectively suppressed.

In a case where the currents IL1, IL2 flow in the lower MOSFETs 31, 33, the current IMc that flows in the motor 130 for traveling increases. In a case where the currents IL1, IL2 flow in the diodes 42, 44, the currents IL1, IL2 reflow and the current IMc decreases. Accordingly, the on-duty ratios of the lower MOSFETs 31, 33 are controlled with the first operation, whereby it is possible to control the current IMc that flows in the motor 130 for traveling.

As will be apparent from FIGS. 3 and 13, in the first operation of the switching circuit 110*c*, the current IL1 that flows in the first sub-reactor 24 is zero immediately before the timing at which the lower MOSFET 31 is turned on (that is, the state T6). Accordingly, switching loss that is generated when the lower MOSFET 31 is turned on is relatively small. In the first operation of the switching circuit 110*c*, immediately before the timing at which the lower MOSFET 33 is turned on (that is, the state T3), the current IL2 that flows in the second sub-reactor 26 is zero. Accordingly, switching loss that is generated when the lower MOSFET 33 is turned on is relatively small.

Figure 14:
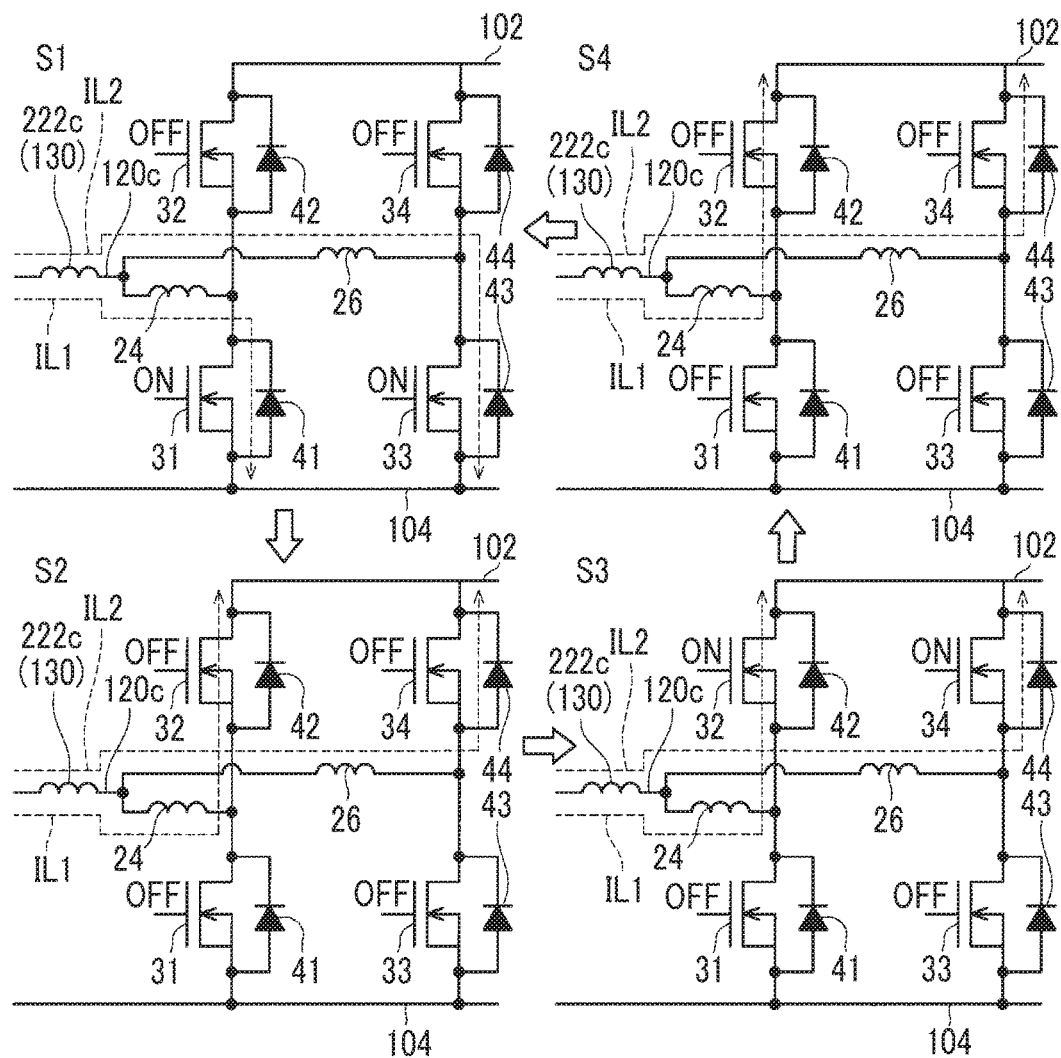
FIG. 14 is a diagram showing change in a state of the switching circuit in a second operation.

A second operation of the switching circuit 110c shown in FIG. 14 is substantially the same as the first operation of the DC-DC converter 10 shown in FIG. 5. As shown in FIG. 14, control is performed such that the switching circuit 110c repeats the cycle of the states S1 to S4. In FIG. 14, the circuit configuration of the switching circuit 110c is simplified compared to that shown in FIG. 12.

In the state S1, the currents IL1, IL2 flow through the lower MOSFETs 31, 33 in the on state. In the states S2 to S4, the currents IL1, IL2 flow through the diodes 42, 44. In a case where the currents IL1, IL2 flow in the lower MOSFETs 31, 33, the current IMc that flows in the motor 130 for traveling increases. In a case where the currents ILL IL2 flow in the diodes 42, 44, the currents IL1, IL2 reflow and the current IMc decreases. Accordingly, the on-duty ratios of the lower MOSFETs 31, 33 are controlled with the second operation, whereby it is possible to control the current IMc that flows in the motor 130 for traveling.

As will be apparent from FIG. 14, in the second operation of the switching circuit 110c, a current is dispersed and flows into the lower MOSFETs 31, 32. Accordingly, it is possible to reduce steady loss in the second operation compared to the first operation.

In the switching circuit 110c of the Example 2, since the first operation is executed at the time of a small current with a relatively high ratio of switching loss, and the second operation is executed at the time of a large current with a relatively high ratio of steady loss, it is possible to effectively suppress loss that is generated in the switching circuit 110c.

In the switching circuit 110c of Example 2, like FIGS. 9 and 10, the number of MOSFETs, diodes, and sub-reactors may be increased. In the switching circuit 110c, like FIG. 8, the second operation may be executed.

The first operation and the second operation of Example 2 may be applied to an operation when the current IMc flows from the switching circuit 110c toward the coil 222c of the motor 130 for traveling. In this case, it is possible to more effectively reduce switching loss in the upper MOSFETs 32, 34 with the first operation.

The relationship between the constituent elements of the examples and the constituent elements of the present disclosure will be described. The direct current power supply 90 of Example 1 is an example of an electric power supply source in the claims. A circuit (that is, the switching circuits 110a, 110b that are connected to the motor wirings 120a, 120b) that supplies the currents IMa and IMb to the motor 130 for traveling of Example 2 is an example of an electric power supply source of the present disclosure. The high potential input wiring 12 of Example 1 and the motor wirings 120a, 120b of Example 2 are an example of a first high potential wiring of the present disclosure. The high potential output wiring 14 of Example 1 and the high potential wiring 102 of Example 2 are an example of a second high potential wiring of the present disclosure. The lower MOSFET 31 of the examples is an example of a first lower FET of the present disclosure. The upper MOSFET 32 of the examples is an example of a first upper FET of the present disclosure. The lower MOSFET 33 of the examples is an example of a second lower FET of the present disclosure. The upper MOSFET 34 of the examples is an example of a second upper FET of the present disclosure.

The lower MOSFET 35 of the examples is an example of a third lower FET of the present disclosure. The upper MOSFET 36 of the examples is an example of a third upper FET of the present disclosure. The diode 42 of the examples is an example of a first diode of the present disclosure. The diode 44 of the examples of a second diode of the present disclosure. The diode 46 of the examples is an example of a third diode of the present disclosure. The states T1, T2 of the examples are an example of a first state of the present disclosure. The state T3 of the examples is an example of a second state of the present disclosure. The states T4, T5 of the examples are an example of a third state of the present disclosure. The state T6 of the examples is an example of a fourth state of the present disclosure. The states T7, T8 of the examples is an example of a fifth state of the present disclosure. The state T9 of the examples is an example of a sixth state of the present disclosure. The timing t1 of the examples is an example of a first timing of the present disclosure. The timing t2 of the examples is an example of a second timing of the present disclosure. The timing t3 of the examples is an example of a third timing of the present disclosure. The timing t4 of the examples is an example of a fourth timing of the present disclosure. The timing t5 of the examples is an example of a fifth timing of the present disclosure. The timing t6 of the examples is an example of a sixth timing of the present disclosure. The timing t7 of the examples is an example of a seventh timing of the present disclosure. The timing t8 of the examples is an example of an eighth timing of the present disclosure.

Technical elements disclosed in the specification are listed below. The following technical elements are useful independently of each other.

In the electric power conversion circuit of an example disclosed in the specification, the gate controller may be configured to perform control, in the first operation, such that the first lower FET, the first upper FET, the second lower FET, and the second upper FET satisfy the following conditions. (Condition 3) The first state is brought next to the fourth state. (Condition 4) The second upper FET is turned on at a third timing in the middle of a period of the fourth state, the second upper FET is maintained in an on state until a fourth timing in the middle of a period of the first state, and the second upper FET is turned off at the fourth timing.

With the above configuration, it is possible to make a current flowing in the second diode be dispersed into the second upper FET from the period of the fourth state to the period of the first state. It is possible to more effectively reduce loss that is generated in the electric power conversion circuit.

In the electric power conversion circuit of an example disclosed in the specification, the gate controller may be configured to execute a second operation. The gate controller may be configured to perform control, in the second operation, such that the first lower FET, the first upper FET, the second lower FET, and the second upper FET satisfy a condition that a state in which both of the first lower FET and the second lower FET are turned on and a state in which both of the first lower FET and the second lower FET are turned off appear alternately. The gate controller may be configured to execute the first operation when a current flowing in the main reactor is equal to or smaller than a threshold Ith, and execute the second operation when the current flowing in the main reactor is greater than the threshold Ith. The threshold Ith may be set to satisfy a relationship of $0.9 \times Ib < Ith < 1.1 \times Ib$ with respect to a boundary value Ib between a current domain where loss generated in the first operation is equal to or smaller than loss generated in the second operation and a current domain where loss generated in the first operation is greater than loss generated in the second operation.

In the above configuration, it is possible to execute the first operation in a small current domain where it is possible to more effectively reduce loss with the first operation, and to execute the second operation in a large current domain where it is possible to more effectively reduce loss with the second operation. With the above, it is possible to more effectively reduce loss that is generated in the electric power conversion circuit.

The electric power conversion circuit of an example disclosed in the specification may further include an n-channel third lower FET, an n-channel third upper FET, a third diode, and a third sub-reactor. The n-channel third lower FET has a source connected to the low potential wiring. The n-channel third upper FET has a source connected to a drain of the third lower FET and a drain connected to the second high potential wiring. The third diode has an anode connected to the source of the third upper FET and a cathode connected to the drain of the third upper FET. The third sub-reactor has a first end connected to the second terminal of the main reactor and a second end connected to the drain of the third lower FET. The gate controller may be connected to a gate of the third lower FET and a gate of the third upper FET. The gate controller may perform control such that the third lower FET is turned off in the first state, the second state, the third state, and the fourth state. The gate controller may be configured to perform control, in the first operation, such that the first lower FET, the first upper FET, the second lower FET, the second upper FET, the third lower FET, and the third upper FET satisfy the following conditions. (Condition 5) The first state, the second state, the third state, the fourth state, the fifth state, and the sixth state appear repeatedly in the order. (Condition 6) The second upper FET is turned on at a fifth timing in the middle of a period of the fourth state, the second upper FET is maintained in an on state until a sixth timing in the middle of a period of the fifth state, and the second upper FET is turned off at the sixth timing. The fifth state may be a state in which the first lower FET is turned off, the second lower FET is turned off, and the third lower FET is turned on. The sixth state may be a state in which all of the first lower FET, the second lower FET, and the third lower FET are turned off.

With the above configuration, in a case where the number of FETs provided in parallel is three or more, it is possible to more effectively reduce loss that is generated in the electric power conversion circuit.

In the electric power conversion circuit of an example disclosed in the specification, the gate controller may be configured to perform control such that the first lower FET, the first upper FET, the second lower FET, the second upper FET, the third lower FET, and the third upper FET satisfy the following conditions. (Condition 7) The first state is brought next to the sixth state. (Condition 8) The third upper FET is turned on at a seventh timing in the middle of a period of the sixth state, the third upper FET is maintained in an on state until an eighth timing in the middle of a period of the first state, and the third upper FET is turned off at the eighth timing.

With the above configuration, it is possible to make a current flowing in the third diode be dispersed in the third upper FET from the period of the sixth state to the period of the first state. It is possible to more effectively reduce loss that is generated in the electric power conversion circuit.

Although the embodiment has been described above in detail, this is for illustrative purposes solely and is not intended to limit the scope of the present disclosure. Various modifications and alterations may be made to the specific examples described above without departing from the scope of the present disclosure. The technical elements described in the specification or the drawings exhibit technical utility alone or in various combinations, and are not limited to the combinations set forth in the claims at the time of filing. The technique described in the specification or the drawings achieves a plurality of objects simultaneously and has technical utility by achieving any one of the objects.

What is claimed is:

1. An electric power conversion circuit comprising:
a first high potential wiring connected to an electric power supply source;
a second high potential wiring;
a low potential wiring;
an n-channel first lower field effect transistor having a source connected to the low potential wiring;
an n-channel first upper field effect transistor having a source connected to a drain of the first lower field effect transistor and a drain connected to the second high potential wiring;
an n-channel second lower field effect transistor having a source connected to the low potential wiring;
an n-channel second upper field effect transistor having a source connected to a drain of the second lower field effect transistor and a drain connected to the second high potential wiring;
a first diode having an anode connected to the source of the first upper field effect transistor and a cathode connected to the drain of the first upper field effect transistor;
a second diode having an anode connected to the source of the second upper field effect transistor and a cathode connected to the drain of the second upper field effect transistor;
a main reactor having a first terminal and a second terminal, the first terminal being connected to the first high potential wiring;
a first sub-reactor having a first end connected to the second terminal of the main reactor and a second end connected to the drain of the first lower field effect transistor;
a second sub-reactor having a first end connected to the second terminal of the main reactor and a second end connected to the drain of the second lower field effect transistor; and
a gate controller connected to a gate of the first lower field effect transistor, a gate of the first upper field effect transistor, a gate of the second lower field effect transistor, and a gate of the second upper field effect transistor, wherein:
the gate controller is configured to execute a first operation; and
the gate controller is configured to perform control, in the first operation, such that the first lower field effect transistor, the first upper field effect transistor, the second lower field effect transistor, and the second upper field effect transistor satisfy
a first condition that a first state in which the first lower field effect transistor is turned on and the second lower field effect transistor is turned off, a second state in which both of the first lower field effect transistor and the second lower field effect transistor are turned off, a third state in which the first lower field effect transistor is turned off and the second lower field effect transistor is turned on, and a fourth state in which both of the first lower field effect transistor and the second lower field effect transistor are turned off appear repeatedly in the order, and a second condition that the first upper field effect transistor is turned on at a first timing during a period of the second state, the first upper field effect transistor is maintained in an on state until a second timing during a period of the third state, and the first upper field effect transistor is turned off at the second timing.

2. The electric power conversion circuit according to claim 1, wherein, the gate controller is configured to perform control, in the first operation, such that the first lower field effect transistor, the first upper field effect transistor, the second lower field effect transistor, and the second upper field effect transistor satisfy a third condition that the first state is brought next to the fourth state, and a fourth condition that the second upper field effect transistor is turned on at a third timing during a period of the fourth state, the second upper field effect transistor is maintained in an on state until a fourth timing during a period of the first state, and the second upper field effect transistor is turned off at the fourth timing.

3. The electric power conversion circuit according to claim 1, wherein:

the gate controller is configured to execute a second operation;

the gate controller is configured to perform control, in the second operation, such that the first lower field effect transistor, and the second lower field effect transistor satisfy a fifth condition that a seventh state in which both of the first lower field effect transistor and the second lower field effect transistor are turned on and an eighth state in which both of the first lower field effect transistor and the second lower field effect transistor are turned off alternate;

the gate controller is configured to execute the first operation when a current flowing in the main reactor is equal to or smaller than a threshold, and execute the second operation when the current flowing in the main reactor is greater than the threshold; and the threshold is set to satisfy a relationship of 0.9× lb<Ith<1.1×lb with respect to a boundary value between a current domain where loss generated in the first operation becomes equal to or less than loss generated in the second operation and a current domain where loss generated in the first operation becomes greater than loss generated in the second operation, where Ith denotes the threshold, lb denotes the boundary value.

4. The electric power conversion circuit according to claim 3, wherein, the gate controller is configured to perform control, in the second operation, such that the first lower field effect transistor, the first upper field effect transistor, the second lower field effect transistor, and the second upper field effect transistor satisfy a sixth condition that following states appear repeatedly in the order, a ninth state in which both of the first lower field effect transistor and the second lower field effect transistor are turned on and both of the first upper field effect transistor and the second upper field effect transistor are turned off, a tenth state in which all of the first lower field effect transistor, the second lower field effect transistor, the first upper field effect transistor, and the second upper field effect transistor are turned off, an eleventh state in which both of the first lower field effect transistor and the second lower field effect transistor are turned off and both of the first upper field effect transistor and the second upper field effect transistor are turned on, and a twelfth state in which all of the first lower field effect transistor, the second lower field effect transistor, the first upper field effect transistor, and the second upper field effect transistor are turned off.

5. The electric power conversion circuit according to claim 3, wherein, the gate controller is configured to perform control, in the second operation, such that the first lower field effect transistor, the first upper field effect transistor, the second lower field effect transistor, and the second upper field effect transistor satisfy a seventh condition that following states alternate, a thirteenth state in which both of the first lower field effect transistor and the second lower field effect transistor are turned on and both of the first upper field effect transistor and the second upper field effect transistor are turned off, and a fourteenth state in which all of the first lower field effect transistor, the second lower field effect transistor, the first upper field effect transistor, and the second upper field effect transistor are turned off.

6. The electric power conversion circuit according to claim 1, further comprising:

an n-channel third lower field effect transistor having a source connected to the low potential wiring;

an n-channel third upper field effect transistor having a source connected to a drain of the third lower field effect transistor and a drain connected to the second high potential wiring;

a third diode having an anode connected to the source of the third upper field effect transistor and a cathode connected to the drain of the third upper field effect transistor; and a third sub-reactor having a first end connected to the second terminal of the main reactor and a second end connected to the drain of the third lower field effect transistor, wherein:

the gate controller is connected to a gate of the third lower field effect transistor and a gate of the third upper field effect transistor;

the gate controller performs control such that the third lower field effect transistor is turned off in the first state, the second state, the third state, and the fourth state;

the gate controller is configured to perform control, in the first operation, such that the first lower field effect transistor, the first upper field effect transistor, the second lower field effect transistor, the second upper field effect transistor, the third lower field effect transistor, and the third upper field effect transistor satisfy an eighth condition that the first state, the second state, the third state, the fourth state, a fifth state, and a sixth state appear repeatedly in the order, and a ninth condition that the second upper field effect transistor is turned on at a fifth timing during a period of the fourth state, the second upper field effect transistor is maintained in an on state until a sixth timing during a period of the fifth state, and the second upper field effect transistor is turned off at the sixth timing;

the fifth state is a state in which the first lower field effect transistor is turned off, the second lower field effect transistor is turned off, and the third lower field effect transistor is turned on; and the sixth state is a state in which all of the first lower field effect transistor, the second lower field effect transistor, and the third lower field effect transistor are turned off.

7. The electric power conversion circuit according to claim 6, wherein, the gate controller is configured to perform control, in the first operation, such that the first lower field effect transistor, the first upper field effect transistor, the second lower field effect transistor, the second upper field effect transistor, the third lower field effect transistor, and the third upper field effect transistor satisfy a tenth condition that the first state is brought next to the sixth state, and an eleventh condition that the third upper field effect transistor is turned on at a seventh timing during a period of the sixth state, the third upper field effect transistor is maintained in an on state until an eighth timing during a period of the first state, and the third upper field effect transistor is turned off at the eighth timing.

8. The electric power conversion circuit according to claim 1, wherein the electric power conversion circuit is a DC-DC converter.

9. The electric power conversion circuit according to claim 1, wherein the electric power conversion circuit is an inverter.

* * * * *